United States Patent
Kawakami

(10) Patent No.: US 10,988,203 B1
(45) Date of Patent: Apr. 27, 2021

(54) BICYCLE OPERATING DEVICE

(71) Applicant: Shimano Inc., Osaka (JP)

(72) Inventor: Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/654,483

(22) Filed: Oct. 16, 2019

(51) Int. Cl.
*B62K 23/06* (2006.01)
*B62M 25/04* (2006.01)

(52) U.S. Cl.
CPC ............. *B62K 23/06* (2013.01); *B62M 25/04* (2013.01)

(58) Field of Classification Search
CPC ................................ B62K 23/06; B62M 25/04
See application file for complete search history.

(56) References Cited

U.S. PATENT DOCUMENTS

| | | | | |
|---|---|---|---|---|
| 9,771,129 | B2 * | 9/2017 | Lim | B62M 25/04 |
| 2013/0081507 | A1 * | 4/2013 | Fukao | B62K 23/06 |
| | | | | 74/502.2 |
| 2016/0297501 | A1 * | 10/2016 | Fukao | B62K 25/04 |
| 2017/0274964 | A1 * | 9/2017 | Kawakami | B62M 25/04 |
| 2018/0072382 | A1 * | 3/2018 | Kawakami | B62K 23/06 |
| 2018/0251191 | A1 * | 9/2018 | Nakamura | B62M 25/045 |
| 2018/0251193 | A1 * | 9/2018 | Fukao | B62K 23/06 |

* cited by examiner

*Primary Examiner* — Thomas C Diaz
(74) *Attorney, Agent, or Firm* — Global IP Counselors, LLP

(57) ABSTRACT

A bicycle operating device includes a base, a positioning ratchet, a positioning pawl, a user operated member, a first release member and a first release pawl. The positioning pawl engages the positioning ratchet to selectively maintain the positioning ratchet in first and second positions. The user operated member is in a first rest position while the positioning ratchet is in the first position, and in a second rest position while the positioning ratchet is in the second position. The positioning pawl is disengaged from the positioning ratchet by the first release member in response to the user operated member being operated from the second rest position in one of a first direction and a second direction. The first release pawl is provided on the user operated member, and contacts the first release member at the second position to maintain the user operated member at the second rest position.

19 Claims, 23 Drawing Sheets

BICYCLE OPERATING DEVICE

BACKGROUND

Technical Field

This disclosure generally relates to a bicycle operating device.

Background Information

Bicycles are typically provided with one or more bicycle operating devices for operating one or more bicycle components. Examples of some these bicycle components include a gear changing device (e.g., a derailleur or an internally geared hub), a suspension and a seatpost. A bicycle operating device is usually provided on a bicycle in a location (e.g., on a bicycle handlebar) for a rider to easily operate the bicycle operating device. The bicycle operating device is often connected to the bicycle component with, for example, a Bowden-type control cable.

SUMMARY

Generally, the present disclosure is directed to various features of a bicycle operating device. In one feature, a bicycle operating device is provided in which a user operated member can be operated in two different directions to perform a releasing operation.

In view of the state of the known technology and in accordance with a first aspect of the present disclosure, a bicycle operating device is provided that basically comprises a base, a positioning ratchet, a positioning pawl, a user operated member, a first release member and a first release pawl. The positioning ratchet is movably arranged with respect to the base between a first position and a second position. The positioning pawl is movably arranged with respect to the base. The positioning pawl is engaged with the positioning ratchet to selectively maintain the positioning ratchet in each of the first position and the second position. The user operated member is movably arranged with respect to the base. The user operated member is disposed in a first rest position while the positioning ratchet is in the first position. The user operated member is disposed in a second rest position while the positioning ratchet is in the second position. The first release member is movably arranged with respect to the base. The positioning pawl is disengaged from the positioning ratchet by the first release member in response to the user operated member being operated from the second rest position in one of a first direction and a second direction. The second direction is different from the first direction. The first release pawl is provided on the user operated member. The first release pawl contacts the first release member at the second position to maintain the user operated member at the second rest position.

With the bicycle operating device according to the first aspect, it is possible to improve the usability of the bicycle operating device.

In accordance with a second aspect of the present disclosure, a bicycle operating device is provided that basically comprises a base, a positioning ratchet, a positioning pawl, a user operated member and a stopping pawl. The positioning ratchet is movably arranged with respect to the base between a first position and a second position. The positioning pawl is movably arranged with respect to the base. The positioning pawl is engaged with the positioning ratchet to selectively maintain the positioning ratchet in each of the first position and the second position. The user operated member is movably arranged with respect to the base. The user operated member is disposed in a first rest position while the positioning ratchet is in the first position, and is disposed in a second rest position while the positioning ratchet is in the second position. The stopping pawl is movably arranged with respect to the base between a stopping position and a non-stopping position. In a state where the positioning ratchet is in the first position, the positioning ratchet is moved from the first position to the second position in response to the user operated member being moved in a first direction. In a state where the positioning ratchet is in the second position, the positioning ratchet is moved from the second position to the first position in response to the user operated member being moved in the first direction. In a state where the positioning ratchet is in the second position, the positioning ratchet is moved from the second position to the first position in response to the user operated member being moved a second direction, which differs from the first direction.

With the bicycle operating device according to the second aspect, it is possible to improve the usability of the bicycle operating device.

In accordance with a third aspect of the present disclosure, the bicycle operating device according to the first or second aspect is configured so that the user operated member includes a pulling pawl. The pulling pawl moves the positioning ratchet from the first position to the second position in response to the user operated member being moved in the first direction.

With the bicycle operating device according to the third aspect, it is possible to easily perform a pulling operation with the user operated member that is also used for a releasing operation.

In accordance with a fourth aspect of the present disclosure, the bicycle operating device according to any one of the first to third aspects is configured so that the first release pawl moves the first release member which moves the positioning pawl such that the positioning pawl permits movement of the positioning ratchet from the second position to the first position in response to the user operated member being moved in the second direction.

With the bicycle operating device according to the fourth aspect, it is possible to improve the operability of the user operated member being moved in the second direction.

In accordance with a fifth aspect of the present disclosure, the bicycle operating device according to any one of the first to fourth aspects further comprises a second release pawl provided on the user operated member. The second release pawl moves the first release member which moves the positioning pawl such that the positioning pawl permits movement of the positioning ratchet from the second position to the first position in response to the user operated member being moved in the first direction.

With the bicycle operating device according to the fifth aspect, it is possible to improve the robustness of the bicycle operating device by providing the second release pawl.

In accordance with a sixth aspect of the present disclosure, the bicycle operating device according to the fifth aspect is configured so that the first release member includes an extension part. The extension part is sandwiched between the first release pawl and the second release pawl while the user operated member remains at the second position.

With the bicycle operating device according to the sixth aspect, it is possible to quickly move the positioning ratchet from the second position to the first position in the releasing direction in response to the user operated member being moved either in the first direction or the second direction.

In accordance with a seventh aspect of the present disclosure, the bicycle operating device according to the second aspect is configured so that the positioning pawl is disengaged from the positioning ratchet which permits movement of the positioning ratchet in a releasing direction while the stopping pawl is engaged with the positioning ratchet which limits movement of the positioning ratchet to move in the releasing direction in response to the user operated member being moved in one of the first direction and the second direction.

With the bicycle operating device according to the seventh aspect, it is possible to limit a releasing movement of the positioning ratchet to release only one ratchet position during a releasing operation.

In accordance with an eighth aspect of the present disclosure, the bicycle operating device according to the seventh aspect is configured so that the stopping pawl is disengaged from the positioning ratchet which permits movement of the positioning ratchet in the releasing direction while the positioning pawl is engaged with the positioning ratchet which limits movement of the positioning ratchet to move in the releasing direction in response to the user operated member being moved in the second direction in a state where the positioning ratchet is between the second position and the first position.

With the bicycle operating device according to the eighth aspect, it is possible to quickly move the positioning ratchet from the second position to the first position in the releasing direction in response to the user operated member being moved in the second direction.

In accordance with a ninth aspect of the present disclosure, the bicycle operating device according to or any one of the second, seventh and eighth aspects is configured so that the positioning pawl and the stopping pawl are a single member that is pivotally mounted to the base.

With the bicycle operating device according to the ninth aspect, it is possible to simplify the construction of the positioning pawl and the stopping pawl.

In accordance with a tenth aspect of the present disclosure, the bicycle operating device according to any one of the first to ninth aspects is configured so that the user operated member and the positioning ratchet are pivotally mounted with respect to the base about a pivot axis.

With the bicycle operating device according to the tenth aspect, it is possible to improve the operability of the user operated member and the positioning ratchet.

In accordance with an eleventh aspect of the present disclosure, the bicycle operating device according to the tenth aspect is configured so that the user operated member and the positioning ratchet are biased about the pivot axis in the second direction.

With the bicycle operating device according to the eleventh aspect, it is possible to improve the operability of the user operated member and the positioning ratchet.

In accordance with a twelfth aspect of the present disclosure, the bicycle operating device according to the tenth or eleventh aspect further comprises a first biasing element and a second biasing element. The first biasing element biases the user operated member with respect to the base in the second direction. The second biasing element biases the positioning ratchet with respect to the base in the second direction.

With the bicycle operating device according to the twelfth aspect, it is possible to improve the operability of the user operated member and the positioning ratchet.

In accordance with a thirteenth aspect of the present disclosure, the bicycle operating device according to the third aspect is configured so that the first release pawl and the pulling pawl are pivotally mounted to the user operated member.

With the bicycle operating device according to the thirteenth aspect, it is possible to reduce the number of parts for moving the first release pawl and the pulling pawl.

In accordance with a fourteenth aspect of the present disclosure, the bicycle operating device according to the thirteenth aspect is configured so that the first release pawl and the pulling pawl pivot about a single pivot axis.

With the bicycle operating device according to the fourteenth aspect, it is possible to simplify the construction of the first release pawl and the pulling pawl.

In accordance with a fifteenth aspect of the present disclosure, the bicycle operating device according to the fourteenth aspect is configured so that the first release pawl and the pulling pawl are a single member.

With the bicycle operating device according to the fifteenth aspect, it is possible to reduce the number of parts for providing the first release pawl and the pulling pawl.

In accordance with a sixteenth aspect of the present disclosure, the bicycle operating device according to the fifth aspect is configured so that the first release pawl and the second release pawl are pivotally mounted to the user operated member.

With the bicycle operating device according to the sixteenth aspect, it is possible to reduce the number of parts for moving the first and second release pawls.

In accordance with a seventeenth aspect of the present disclosure, the bicycle operating device according to the sixteenth aspect is configured so that the first release pawl and the second release pawl pivot about a single pivot axis.

With the bicycle operating device according to the seventeenth aspect, it is possible to simplify the construction of the first and second release pawls.

In accordance with an eighteenth aspect of the present disclosure, the bicycle operating device according to any one of the first to seventeenth aspects further comprises a wire takeup provided to the positioning ratchet.

With the bicycle operating device according to the eighteenth aspect, it is possible to operate a cable operated component with the bicycle operating device.

In accordance with a nineteenth aspect of the present disclosure, the bicycle operating device according to any one of the first to eighteenth aspects further comprises a second release member movably arranged with respect to the base. The second release member is different from the first release member. The second release member moves the positioning pawl so that the positioning pawl is disengaged from the positioning ratchet in response to the first release member moving the second release member.

With the bicycle operating device according to the nineteenth aspect, it is possible to achieve a more reliable operation of the positioning pawl.

In accordance with a twentieth aspect of the present disclosure, the bicycle operating device according to any one of the first to nineteenth aspects further comprises a handlebar attachment coupled to the base.

With the bicycle operating device according to the twentieth aspect, it is possible to attach the bicycle operating device to a handlebar to improve the operability of the bicycle operating device.

Also, other objects, features, aspects and advantages of the disclosed bicycle operating device will become apparent to those skilled in the art from the following detailed description, which, taken in conjunction with the annexed drawings, discloses preferred embodiments of the bicycle operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
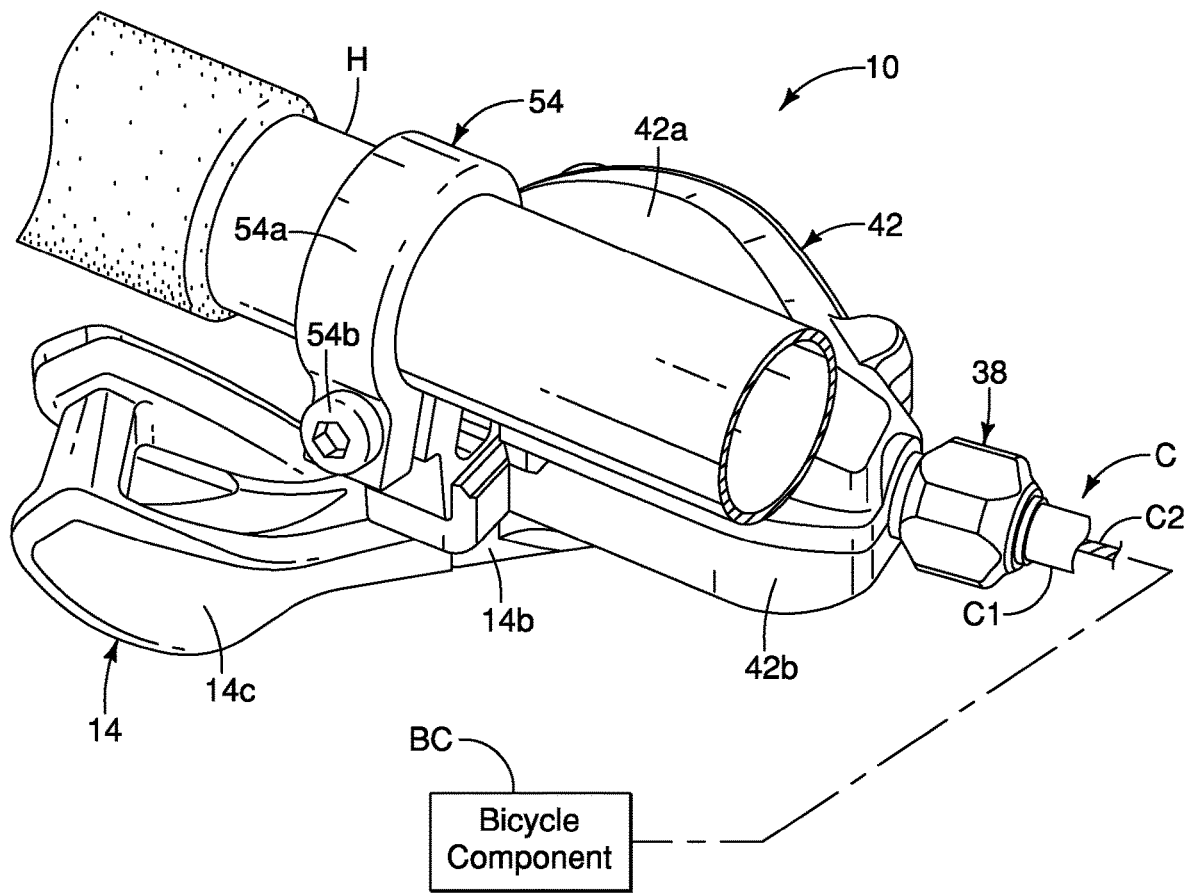
FIG. 1 is a perspective view of a portion of a handlebar of a bicycle equipped with a bicycle operating device in accordance with one illustrative embodiment.
Figure 2:
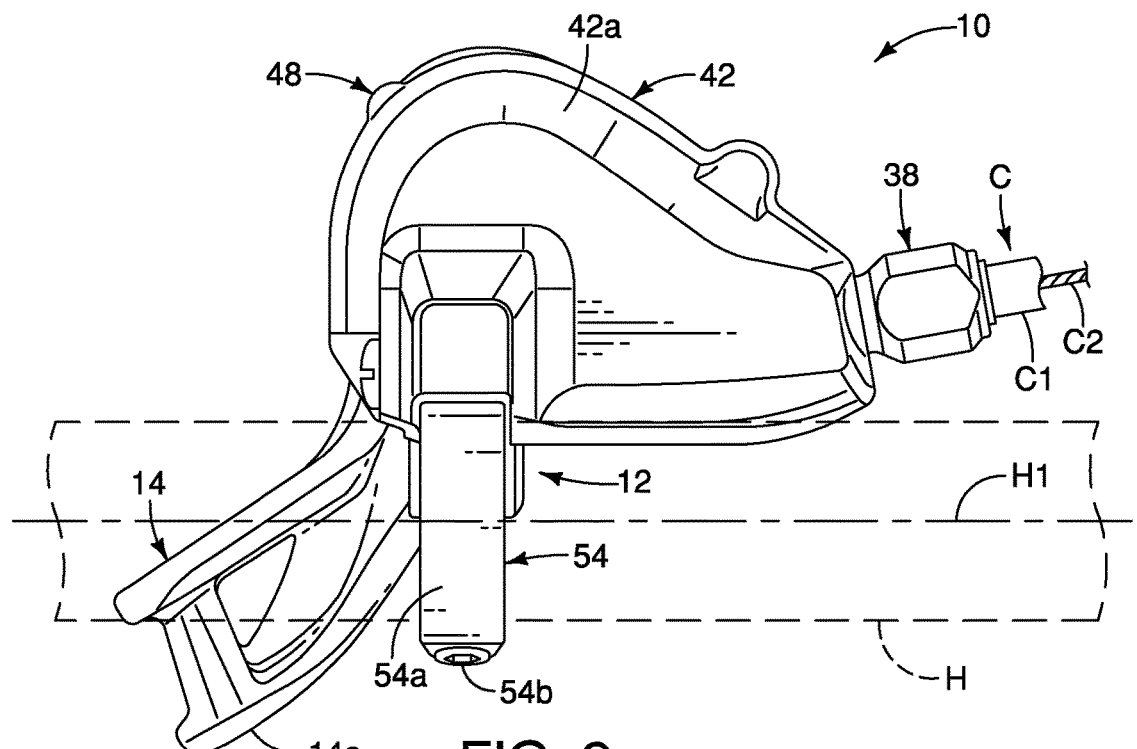
FIG. 2 is a top plan view of the bicycle operating device coupled to the handlebar as illustrated in FIG. 1 in which a user operated member is in a first rest position.
Figure 3:
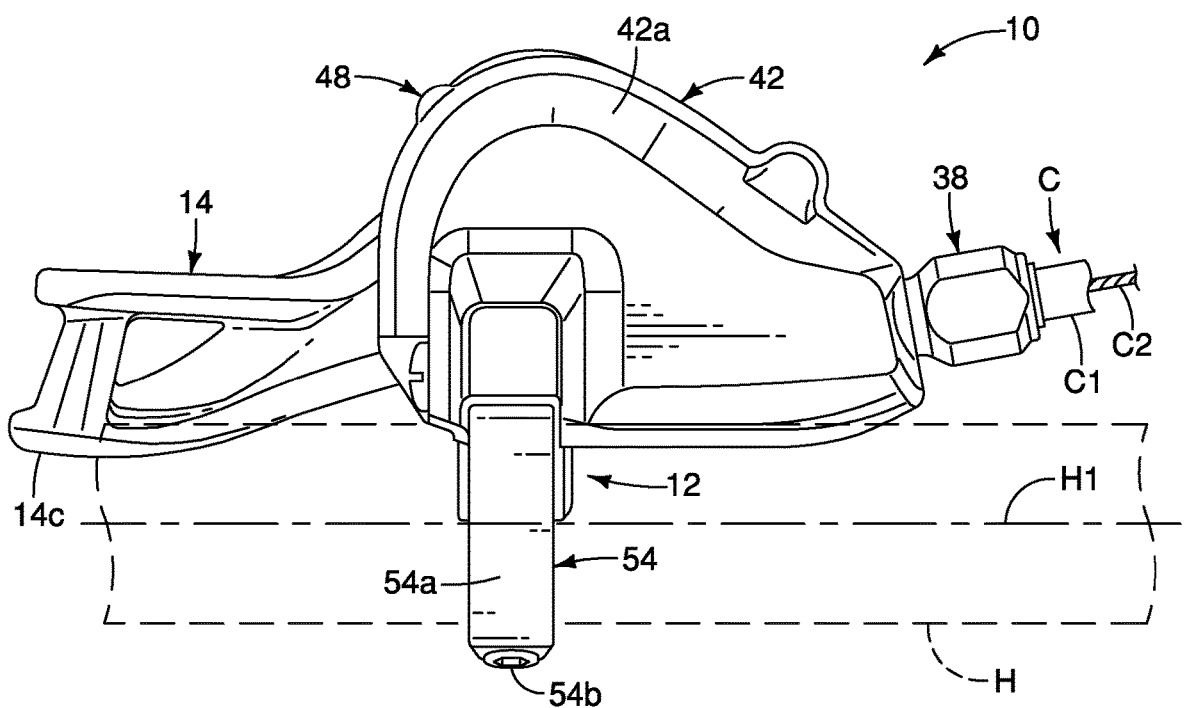
FIG. 3 is a top plan view of the bicycle operating device coupled to the handlebar as illustrated in FIGS. 1 and 2 in which the user operated member is in a second rest position.

Referring initially to FIGS. 1 to 3, a portion of a handlebar H of a bicycle is shown that is equipped with a bicycle operating device 10 in accordance with one illustrative embodiment. The bicycle operating device 10 is arranged, for example, on a left side of the handlebar H so as to be operated by a rider's left hand. Alternatively, the bicycle operating device 10 can be constructed as a mirror image and arranged on a right side of the handlebar H. The bicycle operating device 10 is adjustably mounted to the handlebar H in a longitudinal direction as explained later.

In the illustrated embodiment, as seen in FIG. 1, the bicycle operating device 10 is configured to be operatively coupled to a bicycle component BC via a control cable C. Preferably, as seen in FIG. 1, the control cable C is a conventional bicycle operating cable that has an outer case C1 covering an inner wire C2. In other words, the control cable C is a Bowden type cable in which the inner wire C2 is slidably received within the outer case C1. The inner wire C2 has a cable nipple or attachment barrel C3 (see FIG. 6) for attaching the inner wire C2 to the bicycle operating device 10 as discussed below. The bicycle operating device 10 operates the bicycle component BC by selectively pulling and releasing the inner wire C2. Thus, the bicycle operating device 10 constitutes a bicycle cable operating device.

In the illustrated embodiment, the bicycle operating device 10 is configured as a gear shifter for controlling a gear position of a gear changing device (the bicycle component BC) such as a derailleur or an internally geared hub. However, the bicycle operating device 10 can be used as a bicycle control device for operating other types of bicycle components (e.g., a suspension, an adjustable seatpost, etc.) as needed and/or desired. In the illustrated embodiment, as seen in FIGS. 2 and 3, the bicycle operating device 10 has two rest positions. FIG. 2 shows a first rest position in which the inner wire C2 is fully released, while FIG. 3 shows a second rest position in which the inner wire C2 is fully pulled. In the case of the bicycle operating device 10 being used to operate a front derailleur that is biased to a low position, the first rest position of FIG. 2 corresponds to a low rest position in which the front derailleur is positioned over a low gear, while the second rest position of FIG. 3 corresponds to a top rest position in which the front derailleur is positioned over a top gear.

Referring to FIGS. 4 to 9, the bicycle operating device 10 basically comprises a base 12, a user operated member 14, a positioning ratchet 16 and a positioning pawl 18. As discussed below, the base 12 is a stationary part with respect to the handlebar H. Basically, the user operated member 14 is movably arranged with respect to the base 12 to either pull or release the inner wire C2 with respect to the base 12. The user operated member 14 is movably arranged with respect to the base 12 between a first rest position (FIG. 2) and a second rest position (FIG. 3) to operate the bicycle component BC (FIG. 1). This movement of the user operated member 14 causes the positioning ratchet 16 to be moved. Here, the positioning ratchet 16 is movably arranged with respect to the base 12 between a first position and a second position. The positioning pawl 18 is movably arranged with respect to the base 12. The positioning pawl 18 is engaged with the positioning ratchet 16 to selectively maintain the positioning ratchet 16 in each of the first position and the second position.

Preferably, in the illustrated embodiment, the bicycle operating device 10 further comprises a stopping pawl 20. The stopping pawl 20 is movably arranged with respect to the base 12 between a stopping position and a non-stopping position. The stopping pawl 20 is configured to limit the movement of the positioning ratchet 16 during an actuation (shifting) operation as discussed below.

Since the bicycle operating device 10 is used to pull and release the inner wire C2, the bicycle operating device 10 further comprises a wire takeup 22 that is provided to the positioning ratchet 16. Basically, as a result of the operation of the user operated member 14, the positioning ratchet 16 and the wire takeup 22 are moved to release or pull the inner wire C2 with respect to the base 12. Here, the positioning ratchet 16 and the wire takeup 22 is pivotally mounted to the base 12. The wire takeup 22 has a cable holder 22a that holds the cable attachment barrel C3 (see FIG. 6) of the inner wire C2. In other words, the inner wire C2 is attached to the cable holder 22a of the wire takeup 22 by the cable attachment barrel C3. In this way, the wire takeup 22 moves with the positioning ratchet 16 as the positioning ratchet 16 moves with respect to the base 12. As discussed below, the inner wire C2 is attached to the wire takeup 22, and the positioning pawl 18 engages the positioning ratchet 16 for selectively holding the wire takeup 22 in at least two positions with respect to the base 12. Thus, the positioning ratchet 16 and the positioning pawl 18 define a positioning mechanism 24 of the bicycle operating device 10. In this way, the inner wire C2 is pulled and released with respect to the base 12 to operate the bicycle component BC.

Figure 4:
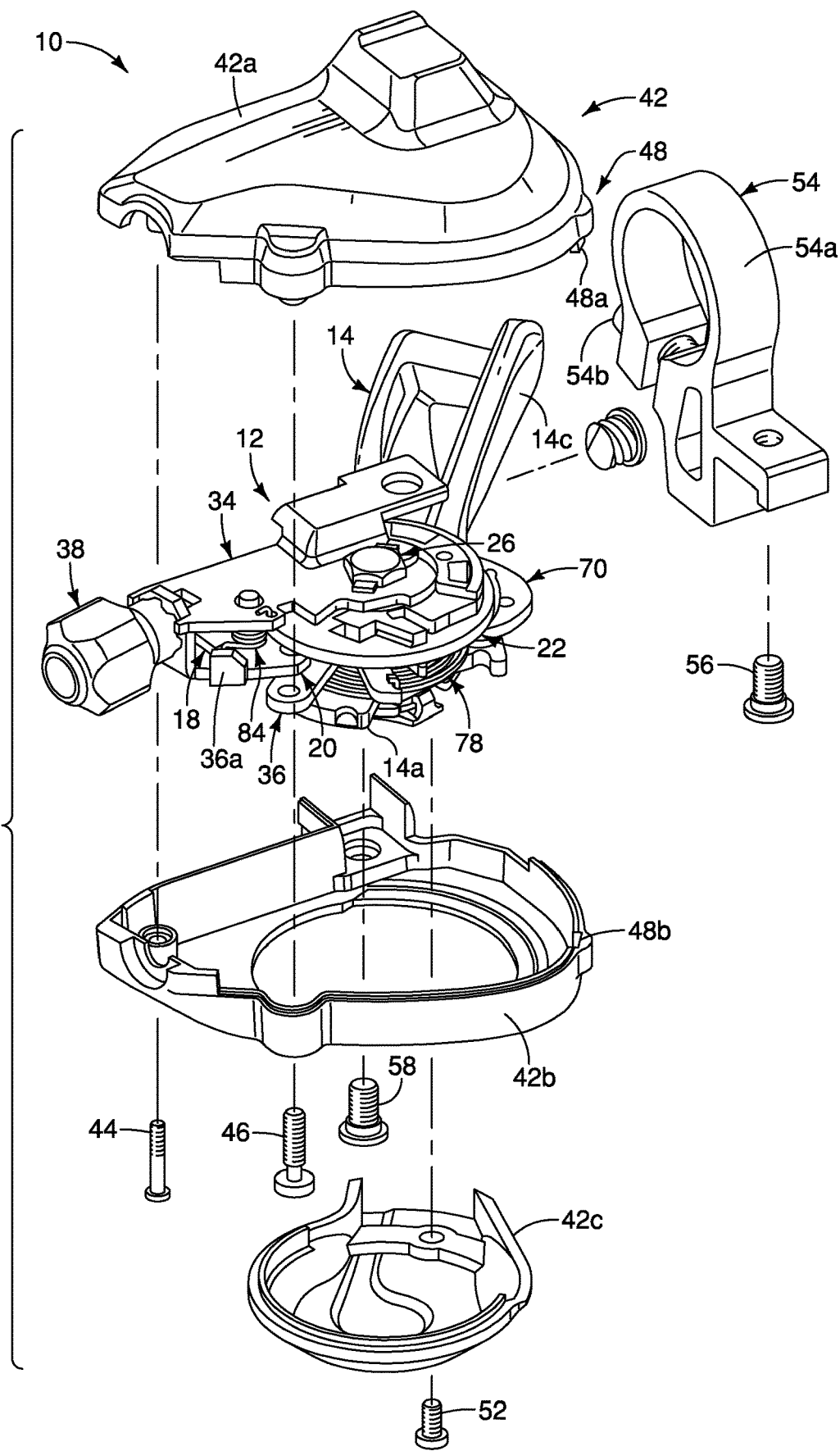
FIG. 4 is a partially exploded perspective view of the bicycle operating device illustrated in FIGS. 1 to 3.
Figure 5:
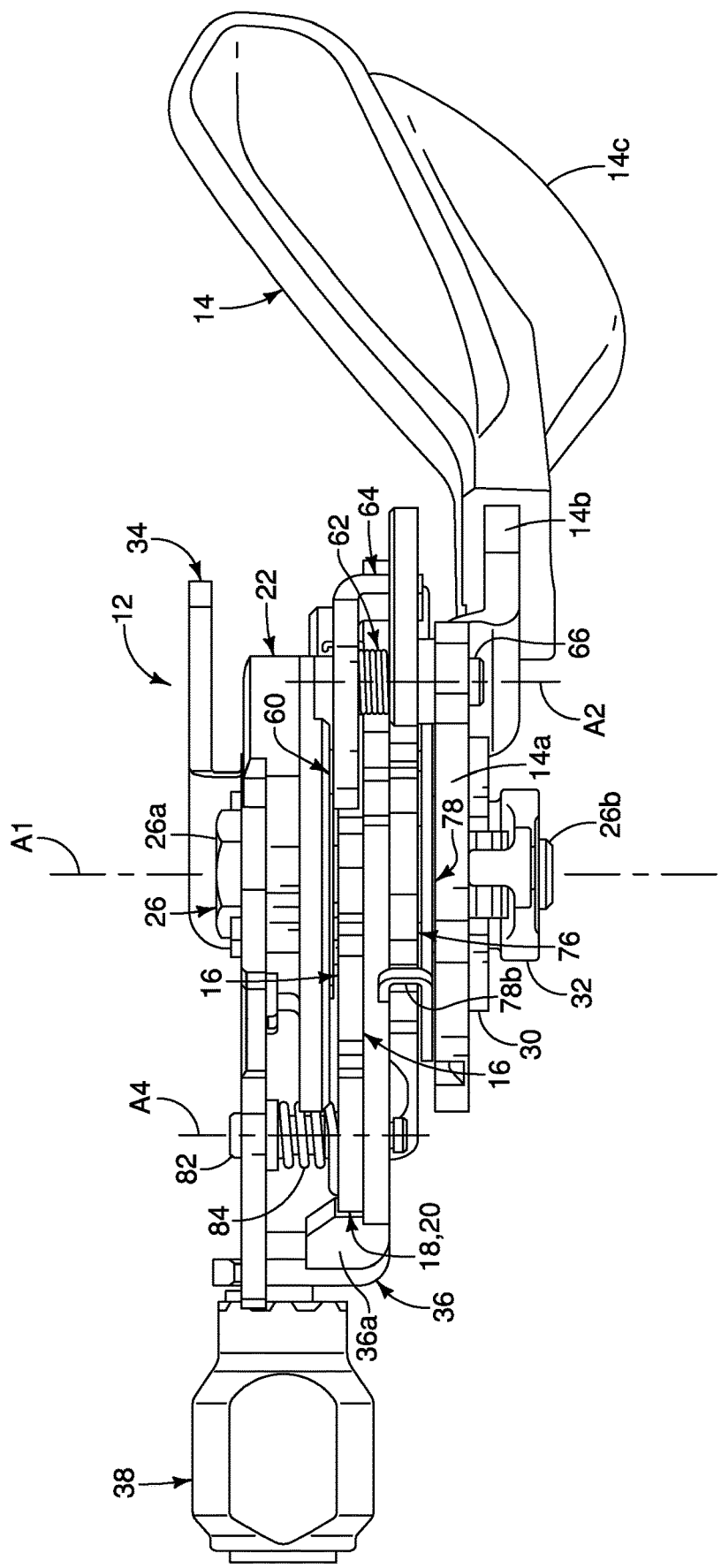
FIG. 5 is an enlarged side elevational view of selected parts of the bicycle operating device in FIGS. 1 to 3.
Figure 6:
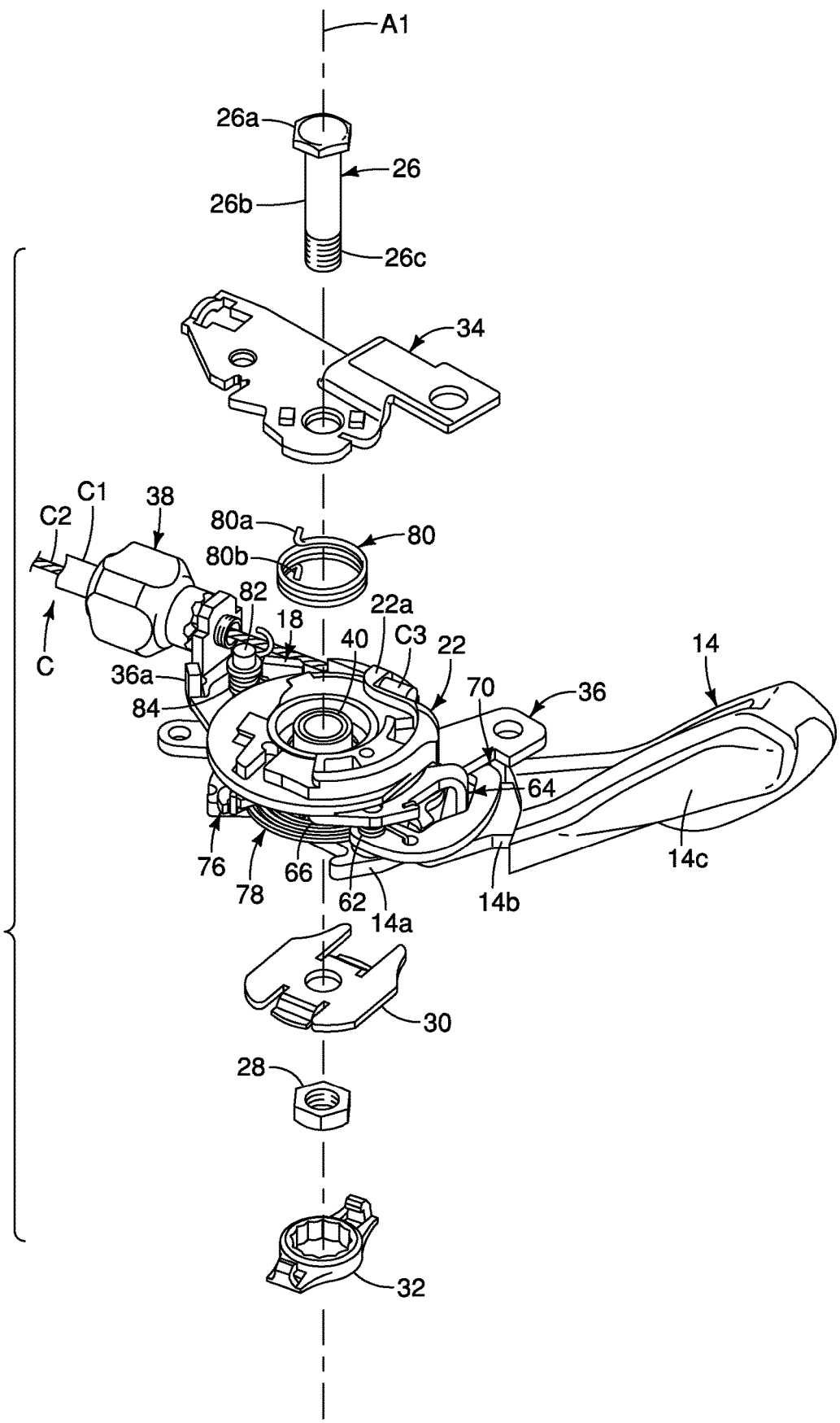
FIG. 6 is a partially exploded perspective view of the bicycle operating device illustrated in FIGS. 1 to 3.
Figure 7:
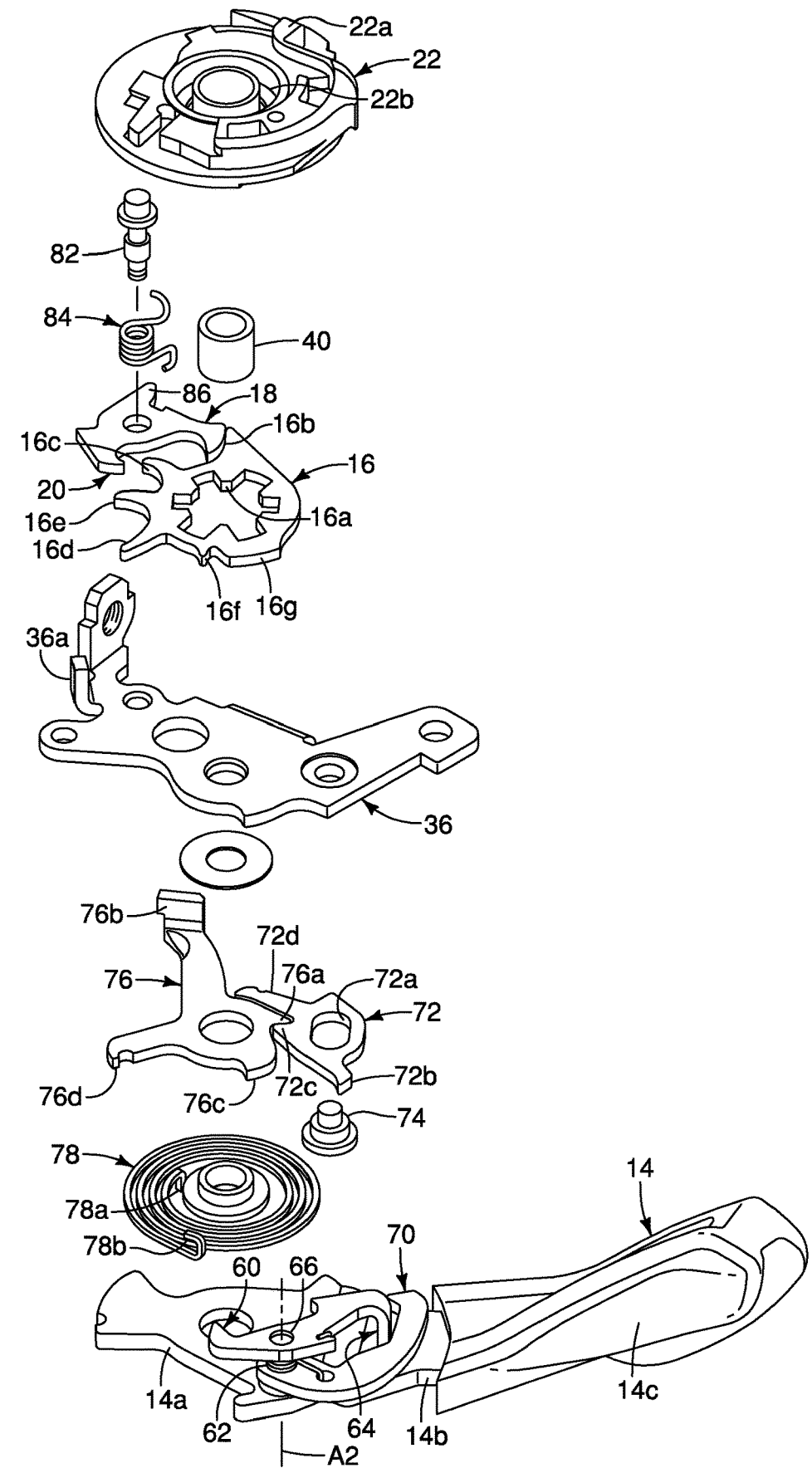
FIG. 7 is a partially exploded perspective view of the bicycle operating device illustrated in FIGS. 1 to 3.

As seen in FIGS. 4 to 7, the base 12 is a stationary support part that supports internal parts (e.g., the positioning ratchet 16, the positioning pawl 18, etc.) of the bicycle operating device 10 as well as supports user operated member 14. The base 12 includes a mounting bolt 26 that pivotally supports the user operated member 14 and the wire takeup 22 for pivotal movement with respect to the base 12 about a center axis A1 (hereinafter referred to as the "pivot axis A1") of the mounting bolt 26. In this way, the mounting bolt 26 acts as a pivot shaft or axle for pivotally support the user operated member 14 and the wire takeup 22 with respect to the base 12. Thus, the user operated member 14 is pivotally mounted to the base 12 to pivot between a first rest position (see FIG. 2) and a second rest position (see FIG. 3). In the illustrated embodiment, as seen in FIG. 6, the mounting bolt 26 has a head portion 26a and a shaft portion 26b. The shaft portion 26b is provided with an external thread 26c. A fixing nut 28 is screwed onto the external thread 26c of the shaft portion 26b. Optionally, as seen in FIGS. 5 and 6, a fixing plate 30 and an anti-rotation clip 32 can be provided to the base 12 to prevent rotation of the fixing nut 28 with respect to the base 12.

In the illustrated embodiment, the base 12 further includes an upper (first) support plate 34 and a lower (second) support plate 36. The upper support plate 34 and the lower support plate 36 are rigid plate members that are bent to form an internal frame of the bicycle operating device 10. For example, the upper support plate 34 and the lower support plate 36 are constructed from metal plates. Basically, the upper support plate 34 and the lower support plate 36 are fixed together by the mounting bolt 26 and the fixing nut 28. Here, the upper support plate 34 and the lower support plate 36 are separate parts that are fastened together by the fixing nut 28 being screwed onto the external thread 26c of the shaft portion 26b. While the upper support plate 34 and the lower support plate 36 are separate members that are attached together in the illustrated embodiment, the upper support plate 34 and the lower support plate 36 can alternatively, be formed as a single member from a single plate that is bent to a desired configuration.

Here, the base 12 is also provided with a barrel adjuster 38 that is adjustably coupled to the base 12 to variably fix a contact point of an end of the outer case C1 relative to the base 12. Also, in the illustrated embodiment, the base 12 further includes a bushing 40 that is disposed between the upper support plate 34 and the lower support plate 36. The wire takeup 22 is rotatably supported on the bushing 40. The bushing 40 also acts as a spacer between the upper support plate 34 and the lower support plate 36 such that the wire takeup 22 can freely rotate about the bushing 40.

Here, as seen in FIG. 4, the bicycle operating device 10 further comprises a housing 42 that covers the base 12 and the internal parts of the bicycle operating device 10. The inner wire C2 is feed out of the housing 42 and pull into the housing 42 in response to operation of the user operated member 14. Here, for example, the housing 42 includes an upper (first) case 42a, a lower (second) case 42b and a bottom cover 42c. The upper case 42a and the lower case 42b are coupled together by fasteners. Here, the upper case 42a and the lower case 42b are coupled together by two screws 44 and 46 and a snap-fit connection 48 (a cantilevered prong on the upper case 42a and a snap-in recess on the lower case 42b). The lower case 42b is also fastened to the base 12 by a fixing bolt 50. The bottom cover 42c is fastened to the user operated member 14 by a screw 52 such that the bottom cover 42c moves relative to the base 12 as the user operated member 14 moves relative to the base 12. The upper case 42a, the lower case 42b and the bottom cover 42c of the housing 42 are hard rigid members that are constructed of a suitable material such as a hard plastic or a lightweight metal such as aluminum. However, the housing 42 can have a variety of configurations as needed and/or desired. While the housing 42 is described as a separate element from the base 12, the upper case 42a and the lower case 42b of the housing 42 can be considered part of the base 12 in that the housing 42 is a stationary support part that is integrated with the base 12.

Referring back to FIGS. 1 to 4, the bicycle operating device 10 further comprises a handlebar attachment 54 that is coupled to the base 12. The handlebar attachment 54 is removably attached to the base 12 by the fixing bolt 50 and another fixing bolt 56. While not shown, the handlebar attachment 54 can be adjustably mounted to the housing 42 as needed and/or desired. While the handlebar attachment 54 is described as a separate element from the base 12, the handlebar attachment 54 can be considered part of the base 12 in that the handlebar attachment 54 is a stationary support part that is integrated with the base 12. The handlebar attachment 54 is configured to be mounted to the handlebar H in a conventional manner. The handlebar attachment 54 is preferably made of a strong rigid material such as a metallic material or a reinforced resin material. Here, the handlebar attachment 54 has a handlebar clamp 54a and a tightening bolt 54b for tightening the handlebar clamp 54a around the handlebar H. While the handlebar clamp 54a is shown as a one-piece, unitary member (i.e., a non-hinged clamp), the handlebar clamp 54a can be a hinged clamp having a pair of curved jaws pivotally connected at one end and adjustably coupled by a bolt at the other end.

As seen in FIGS. 2 and 3, the user operated member 14 is movably arranged with respect to the base 12. Namely, as mentioned above, the user operated member 14 is movably arranged with respect to the base 12 between the first rest position (FIG. 2) and the second rest position (FIG. 3) to operate the bicycle component BC (FIG. 1). Thus, in the illustrated embodiment, the user operated member 14 has two different rest positions. The term "rest position" as used herein refers to a state in which a part (e.g., the user operated member 14) remains stationary without the need of a user holding the part in that state. On the other hand, the term "operated position" as used herein refers to a temporary state in which a part (e.g., the user operated member 14) temporarily held in a position due to an external force being inputted into the bicycle operating device 10.

In the illustrated embodiment, the user operated member 14 is disposed in the first rest position (FIG. 2) while the positioning ratchet 16 is in the first position. The user operated member 14 is disposed in the second rest position (FIG. 3) while the positioning ratchet 16 is in the second position. Basically, as seen in FIGS. 10 to 14, the user operated member 14 is moved in a first direction D1 from the first rest position (FIG. 2) to an operated position for performing a pulling operation of the inner wire C2 with respect to the base 12. During a pulling operation, the positioning ratchet 16 and the wire takeup 22 are pivoted in the first direction D1 about the pivot A1. Thus, the first direction D1 can also be considered a pulling direction with respect to the positioning ratchet 16 and the wire takeup 22. On the other hand, the user operated member 14 can be operated from the second rest position (FIG. 3) in either the first direction D1 or in a second direction D2 that is opposite to the first direction D1. Thus, the second direction D2 is different from the first direction D1. In the illustrated embodiment, the first direction D1 is a curved path having a center of curvature located on the pivot A1 defined by the mounting bolt 26, and the second direction D2 is a curved path having a center of curvature located on the pivot axis A1 defined by the mounting bolt 26. Specifically, the user operated member 14 is pivotally mounted with respect to the base 12 about the pivot axis A1. During a releasing operation, the positioning ratchet 16 and the wire takeup 22 are pivoted in the second direction D2 about the pivot A1. Thus, the second direction D2 can also be considered a releasing direction with respect to the positioning ratchet 16 and the wire takeup 22.

Here, the user operated member 14 includes an attachment portion 14a that is disposed inside the housing 42 and a lever portion 14b that extends outside of the housing 42 from the attachment portion 14a. The attachment portion 14a is pivotally attached to the base 12 by the mounting bolt 26. The lever portion 14b is arranged such that the user moves the lever portion 14b to pivot the user operated member 14 with respect to the base 12. The attachment portion 14a and the lever portion 14b are, for example, formed of a single metal piece with the lever portion 14b having a plastic user contact portion 14c molded thereon as shown. Thus, the user operated member 14 constitutes a user operated lever that is pivotally mounted to the base 12. When the user operated member 14 is in the first rest position (FIG. 2), the user contact portion 14c is at least mostly positioned on the rear side (lower side in FIG. 2) of a center longitudinal axis H1 of the handlebar H. On the other hand, when the user operated member 14 is in the second rest position (FIG. 3), the user contact portion 14c is completely positioned on the front side (upper side in FIG. 3) of the center longitudinal axis H1 of the handlebar H.

To effectuate a pulling operation of the wire takeup 22, the user operated member 14 includes a pulling pawl 60. In other words, the pulling pawl 60 is provided on the user operated member 14 so that the pulling pawl 60 is moved with the movement of the user operated member 14. The pulling pawl 60 engages the positioning ratchet 16 to move the wire takeup 22 in the first direction D1 during a pulling operation. Namely, the pulling pawl 60 moves the positioning ratchet 16 from the first position to the second position in response to the user operated member 14 being moved in the first direction D1 from the first rest position. As the positioning ratchet 16 moves from the first position to the second position, the wire takeup 22 pivots with respect to the base 12 in the first direction D1, which corresponds to a cable pulling direction. Preferably, the pulling pawl 60 is biased towards contact with the positioning ratchet 16 by a biasing element 62 (e.g., a torsion spring).

When the user operated member 14 is moved from the second rest position in either the first direction D1 or the second direction D2 during a releasing operation, the pulling pawl 60 does not engage the positioning ratchet 16 to move the wire takeup 22 with respect to the base 12. Rather, the bicycle operating device further comprises a first release pawl 64. Here, the first release pawl 64 is provided on the user operated member 14. The first release pawl 64 is configured to transmit the movement of the user operated member 14 during a releasing operation to move the positioning pawl 18 out of engagement so that the wire takeup 22 and the positioning ratchet 16 can move with respect to the base 12 in the second direction D2. In particular, the positioning ratchet 16 and the wire takeup 22 pivot with respect to the base 12 in the second direction D2, which corresponds to a cable releasing direction. In the illustrated embodiment, the first release pawl 64 and the pulling pawl 60 are pivotally mounted to the user operated member 14. Preferably, the first release pawl 64 and the pulling pawl 60 pivot about a single pivot axis A2. For example, the user operated member 14 has a pivot pin 66 that pivotally supports the first release pawl 64 and the pulling pawl 60. More preferably, the first release pawl 64 and the pulling pawl 60 are a single member. However, the first release pawl 64 and the pulling pawl 60 can be configured as separate members that pivot on the same pivot axis or separate members that pivot on different pivot axes. Since the biasing element 62 biases the pulling pawl 60 towards contact with the positioning ratchet 16, the first release pawl 64 is biased away from the positioning ratchet 16 by the biasing element 62.

Figure 8:
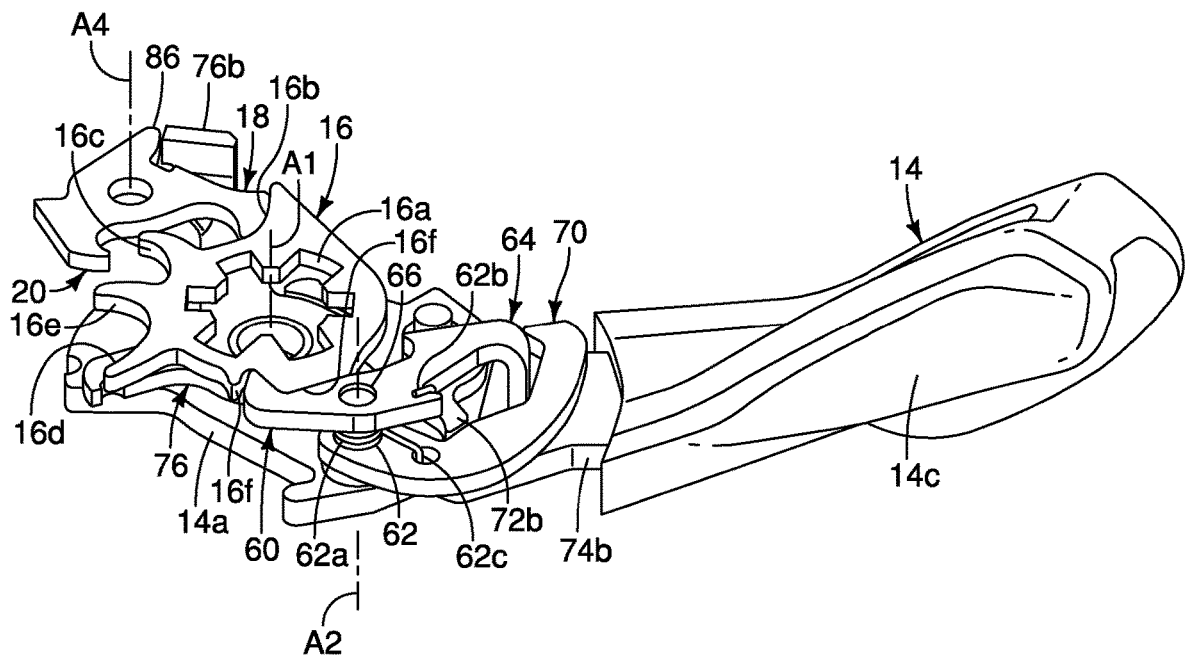
FIG. 8 is a perspective view of selected parts of the bicycle operating device in FIGS. 1 to 3.
Figure 9:
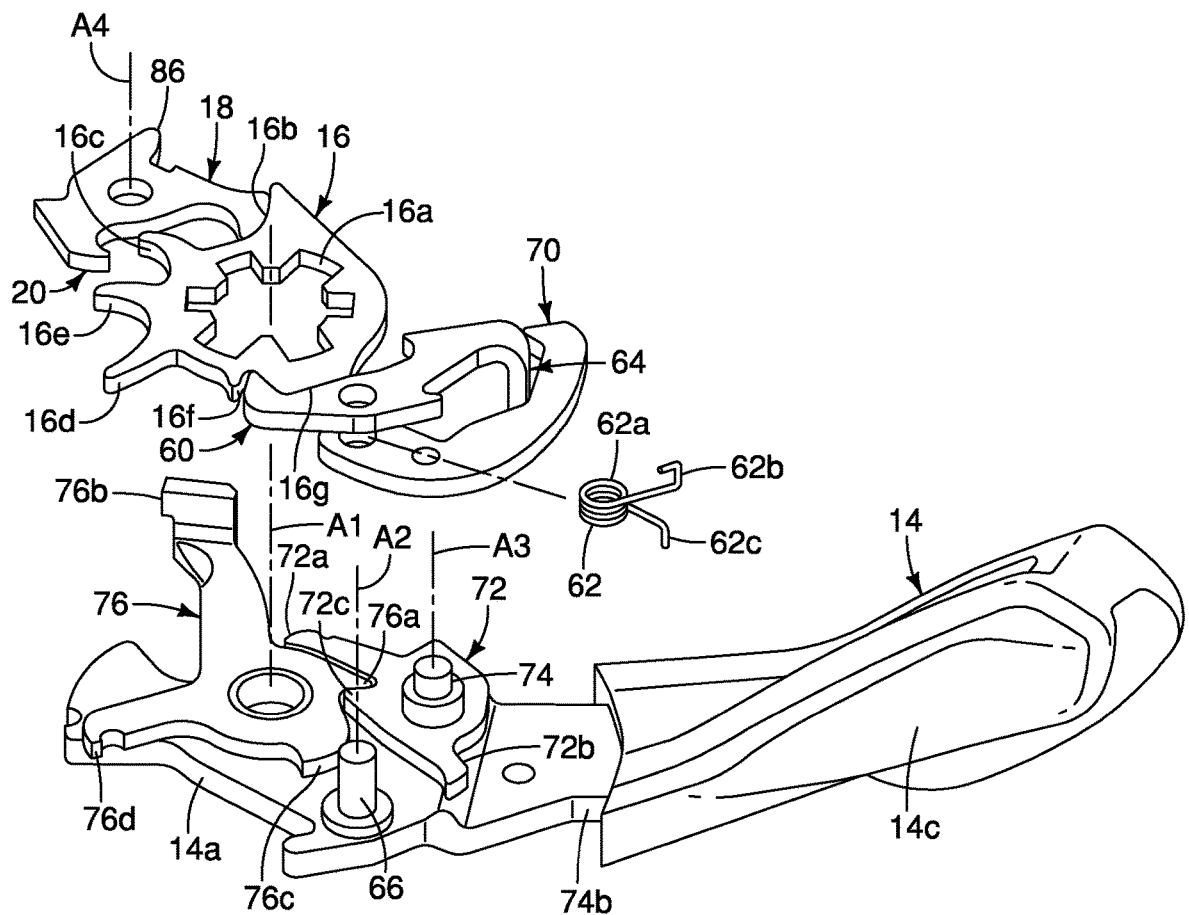
FIG. 9 is a partially exploded perspective view of the selected parts of the bicycle operating device that are illustrated in FIG. 8.

Preferably, the bicycle operating device 10 further comprises a second release pawl 70 that is provided on the user operated member 14. The second release pawl 70 is configured to transmit the movement of the user operated member 14 during a releasing operation to move the positioning pawl 18 out of engagement so that the wire takeup 22 and the positioning ratchet 16 can move with respect to the base 12 in the second direction D2 as explained below. Basically, the second release pawl 70 is used to perform a releasing operation in response to the user operated member 14 being moved from the second rest position in the first direction D1. On the other hand, the first release pawl 64 is used to perform a releasing operation in response to the user operated member 14 being moved from the second rest position in the second direction D2. Here, the biasing element 62 also biases the second release pawl 70 towards contact with the first release pawl 64. As seen in FIG. 8, the biasing element 62 is a torsion spring that has a coiled portion disposed on the pivot pin 66, a first leg portion hooked onto the second release pawl 70 and a second leg portion hooked onto the first release pawl 64. In this way, the first release pawl 64 and the second release pawl 70 biased in opposite directions (towards each other) about the pivot pin 66.

In the illustrated embodiment, preferably, the first release pawl 64 and the second release pawl 70 are pivotally mounted to the user operated member 14. More preferably, the first release pawl 64 and the second release pawl 70 pivot about the single pivot axis A2. Here, the first release pawl 64 and the second release pawl 70 pivot about the pivot axis A2 which is also the pivot axis A2 of the pulling pawl 60. Thus, the second release pawl 70 is pivotally mounted on the user operated member 14 by the pivot pin 66 of the first release pawl 64 and the pulling pawl 60. However, the first release pawl 64 and the second release pawl 70 can be configured to pivot on different pivot axes. Also, here, the biasing element 62 biases the second release pawl 70 towards the positioning ratchet 16.

To effectuate a releasing operation of the wire takeup 22, the bicycle operating device further comprises a first release member 72. The first release member 72 is movably arranged with respect to the base 12. Namely, the first release member 72 is movably arranged with respect to the base 12 between a non-releasing position and a releasing position. In the illustrated embodiment, preferably, the first release member 72 is movably mounted to a bottom side of the lower support plate 36 by a support pin 74. The first release member 72 has an arcuate slot 72a for receiving the support pin 74. Thus, movement of the first release member 72 is limited by the support pin 74 disposed in the arcuate slot 72a. The arcuate slot 72a is curved such that its center of curvature is located on the pivot axis A1. In this way, the first release member 72 can move on the support pin 74 along a curved path having its center of curvature is located on the pivot axis A1. Also, the first release member 72 can pivot on a pivot axis A3 defined by the support pin 74. In particular, the first release member 72 pivots on the support pin when the user operated member 14 moved from the second rest position in the first direction D1, and moves along the curved path when the user operated member 14 moved from the second rest position in the second direction D2.

Accordingly, the first release member 72 is moved in response to operation of the user operated member 14 moved from the second rest position in either the first direction D1 or the second direction D2 to perform a releasing operation. More specifically, the first release pawl 64 moves the first release member 72 which moves the positioning pawl 18 such that the positioning pawl 18 permits movement of the positioning ratchet 16 from the second position to the first position in response to the user operated member 14 being moved in the second direction D2 from the second rest position. Also, the second release pawl 70 moves the first release member 72 which moves the positioning pawl 18 such that the positioning pawl 18 permits movement of the positioning ratchet 16 from the second position to the first position in response to the user operated member 14 being moved in the first direction D1 from the second rest position.

Here, in the illustrated embodiment, the first release pawl 64 contacts the first release member 72 at the second position to maintain the user operated member 14 at the second rest position. For example, the first release member 72 includes an extension part 72b. The extension part 72b is sandwiched between the first release pawl 64 and the second release pawl 70 while the user operated member 14 remains at the second rest position. In this way, the extension part 72b of the first release member 72 is contacted by at least one of the first release pawl 64 and the second release pawl 70 to move the first release member 72 in response to operation of the user operated member 14 from the second rest position. Also, since an operating force of the extension part 72b of the first release member 72 about the pivot axis A1 is larger than an rotating force of the first release pawl 64 mounted on the user operated member 14 about the pivot axis A1, the extension part 72b of the first release member 72 acts as a stop to prevent the user operated member 14 from returning to the first rest position. In other words, the extension part 72b of the first release member 72 abut against the first release pawl 64 to hold the user operated member 14 in the second rest position.

In the illustrated embodiment, the first release pawl 64 is different from the second release pawl 70, and the second release pawl 70 is movable relative to the first release pawl 64. However, the first release pawl 64 and the second release pawl 70 can be a one piece member (a single member). In either case, the first release pawl 64 contacts the first release member 72 to maintain the user operated member 14 at the second rest position while the positioning ratchet 16 is in the second position.

Preferably, as in the illustrated embodiment, the bicycle operating device 10 further comprises a second release member 76 that is movably arranged with respect to the base 12. Namely, the second release member 76 is movably arranged with respect to the base 12 between a non-releasing position and a releasing position. Here, the second release member 76 is pivotally mounted on the mounting bolt 26 to pivot about the pivot axis A1. The second release member 76 pivots in the second direction D2 about the pivot axis A1 when the second release member 76 moves from the rest position to an actuated position in response to the user operated member 14 being operated from the second rest position to perform a releasing operation.

Here, in the illustrated embodiment, the first release member 72 further includes a first projection 72c and a second projection 72d. The first projection 72c and the second projection 72d are configured to that mate with the second release member 76. Namely, the second release member 76 includes a force reception finger 76a that is received in a recess defined by the first projection 72c and the second projection 72d of the first release member 72. The force reception finger 76a is configured to receive an operating force transmitted from the first release member 72 in response to the user operated member 14 being operated from the second rest position to perform a releasing operation. Thus, the first projection 72c and the second projection 72d of the first release member 72 mate with the force reception finger 76a of the second release member 76 such that the first release member 72 and the second release member 76 do not move relative to each other while the user operated member 14 is in either the first rest position or the second rest position. Moreover, when the user operated member 14 is operated from the second rest position in the second direction D2, the first release member 72 and the second release member 76 do not practically move relative to each other, but rather move together as a unit (i.e., practically no relative movement) about the pivot axis A1. On the other hand, when the user operated member 14 is operated from the second rest position in the first direction D1, the first release member 72 and the second release member 76 move relative to each other. Namely, when the user operated member 14 is operated from the second rest position in the first direction D1, the first release member 72 pivots on the support pin 74 about the pivot axis A3, while the second release member 76 pivots on the mounting bolt 26 about the pivot axis A1. In either case, when the user operated member 14 is operated from the second rest position in the first direction D1 or the second direction D2, the operating force from the user is transmitter from the user operated member 14 through the first release member 72 and the second release member 76 to the positioning pawl 18 to pivot the positioning pawl 18 from the holding position to the releasing position.

Here, the second release member 76 further includes a force transmission finger 76b. The force transmission finger 76b is configured to transmit the operating force from the first release member 72 to the positioning pawl 18 so as to move the positioning pawl 18 from a holding position to a releasing position. In other words, the second release member 76 moves the positioning pawl 18 so that the positioning pawl 18 is disengaged from the positioning ratchet 16 in response to the first release member 72 moving the second release member 76. When the second release member 76 is pivoted by the user operated member 14, the positioning pawl 18 moves temporarily out of engagement with the positioning ratchet 16. As a result of the disengagement of the positioning pawl 18 from the positioning ratchet 16, the positioning ratchet 16 and the wire take-up are free to rotate from the second position towards the first position in the second direction D2 about the pivot axis A1.

Here, the second release member 76 further includes a pawl abutment 76c for selectively contacting the first release pawl 64 when the user operated member 14 is in the second rest position. In this way, the first release pawl 64 is prevented from rotating about the pivot axis A2. The first release pawl 64 does not contact the pawl abutment 76c of the second release member 76 when the user operated member 14 is in the first rest position. Since the first release pawl 64 and the second release member 76 lie in the same plane, the pawl abutment 76c of the second release member 76 is formed by an edge of the plate that forms the second release member 76.

Here, the second release member 76 is different from the first release member 72. In this way, the user operated member 14 can be operated from the second rest position in either the first direction D1 or the second direction D2 to perform a releasing operation as mentioned above. However, the first release member 72 and the second release member 76 can be a one piece member (a single member) if needed and/or desired.

In the illustrated embodiment, the user operated member 14 is biased about the pivot axis A1 in the second direction D2. Preferably, the bicycle operating device 10 further comprises a first biasing element 78. The first biasing element 78 biases the user operated member 14 with respect to the base 12 in the second direction D2. The first biasing element 78 is also used to bias the first release member 72 and the second release member 76 to their rest positions. Here, for example, the first biasing element 78 is a torsion spring that is mounted on the mounting bolt 26. A first free end 78a of the first biasing element 78 is hooked into an opening in the user operated member 14 to bias the user operated member 14 in the second direction D2. The user operated member 14 is biased by the biasing force of the first biasing element 78 into contact with an abutment formed on the lower support plate 36. A second free end 78b of the first biasing element 78 is hooked onto an arm 76d of the second release member 76. As mentioned above, the first projection 72c and the second projection 72d of the first release member 72 mate with the force reception finger 76a of the second release member 76 such that the first release member 72 and the second release member 76 do not move relative to each other while the user operated member 14 is in either the first rest position or the second rest position. Thus, the biasing force of the first biasing element 78 is transmitted to the first release member 72 through the second release member 76. The first release member 72 is biased by the biasing force of the first biasing element 78 into contact with the support pin 74 that is attached to the lower support plate 36.

Now, the positioning ratchet 16 will be discussed in more detail. Basically, the positioning ratchet 16 is pivotally mounted with respect to the base 12 about the pivot axis A1. Here, the positioning ratchet 16 is non-movably mounted to the wire takeup 22 so that the positioning ratchet 16 and the wire takeup 22 pivot as a unit on the mounting bolt 26. For example, the positioning ratchet 16 has a non-circular mounting opening 16a that receives and mates with a non-circular protrusion of the wire takeup 22. In this way, the positioning ratchet 16 does not move relative to the wire takeup 22. However, the positioning ratchet 16 and the wire takeup 22 can be formed as a one-piece member as needed and/or desired.

In the illustrated embodiment, the positioning ratchet 16 is biased about the pivot axis A1 in the second direction D2. Preferably, the bicycle operating device 10 further comprises a second biasing element 80. The second biasing element 80 biases the positioning ratchet 16 with respect to the base 12 in the second direction D2. Here, for example, the second biasing element 80 is a torsion spring that is mounted on the mounting bolt 26. Preferably, the wire takeup 22 has an annular recess 22b (FIG. 7) for receiving the second biasing element 80. The second biasing element 80 includes a first free end 80a hooked into an opening in the wire takeup 22 and a second free end 80b hooked on to the upper support plate 34 to bias the positioning ratchet 16 and the wire takeup 22 in the second direction D2.

The positioning ratchet 16 includes a first positioning tooth 16b and a second positioning tooth 16c. The first positioning tooth 16b is configured to be engaged with the positioning pawl 18 to establish the first position of the positioning ratchet 16. The second positioning tooth 16c is configured to be engaged with the positioning pawl 18 to establish the second position of the positioning ratchet 16. Operation of the user operated member 14 is used to switch the positioning ratchet 16 from the first position to the second position. More specifically, in a state where the positioning ratchet 16 is in the first position, the positioning ratchet 16 is moved from the first position to the second position in response to the user operated member 14 being moved in a first direction D1. Operation of the user operated member 14 is also used to switch the positioning ratchet 16 from the second position to the first position. More specifically, in a state where the positioning ratchet 16 is in the second position, the positioning ratchet 16 is moved from the second position to the first position in response to the user operated member 14 being moved in the first direction D1. Also, as mentioned above, the positioning ratchet 16 can be operated by the user operated member 14 being operated the second direction D2. Thus, in a state where the positioning ratchet 16 is in the second position, the positioning ratchet 16 is moved from the second position to the first position in response to the user operated member 14 being moved the second direction D2.

Figure 12:
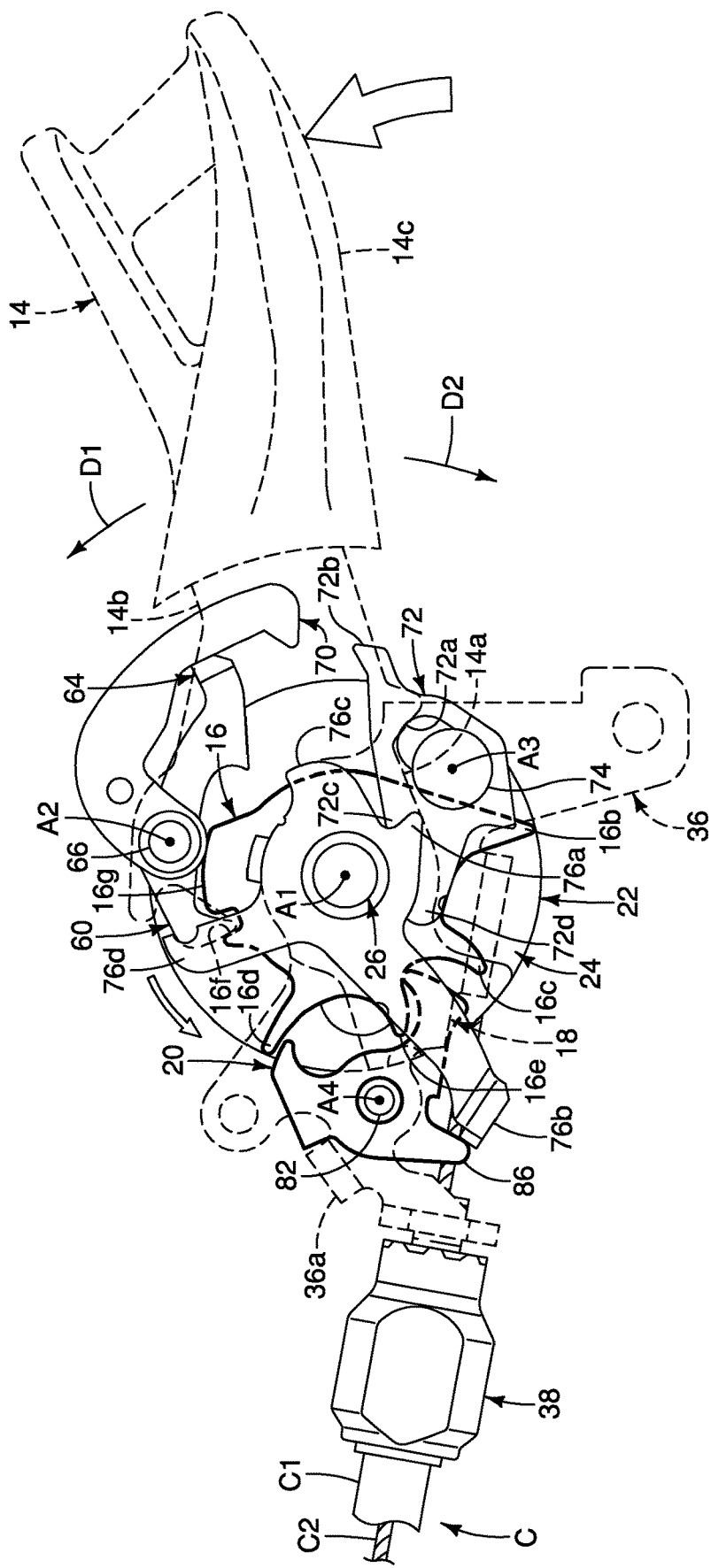
FIG. 12 is a bottom view of the selected parts of the bicycle operating device in FIGS. 1 to 3 in which the user operated member has been moved farther from the partially operated position of FIG. 11 in the first direction to the operated position to perform the cable pulling operation.
Figure 15:
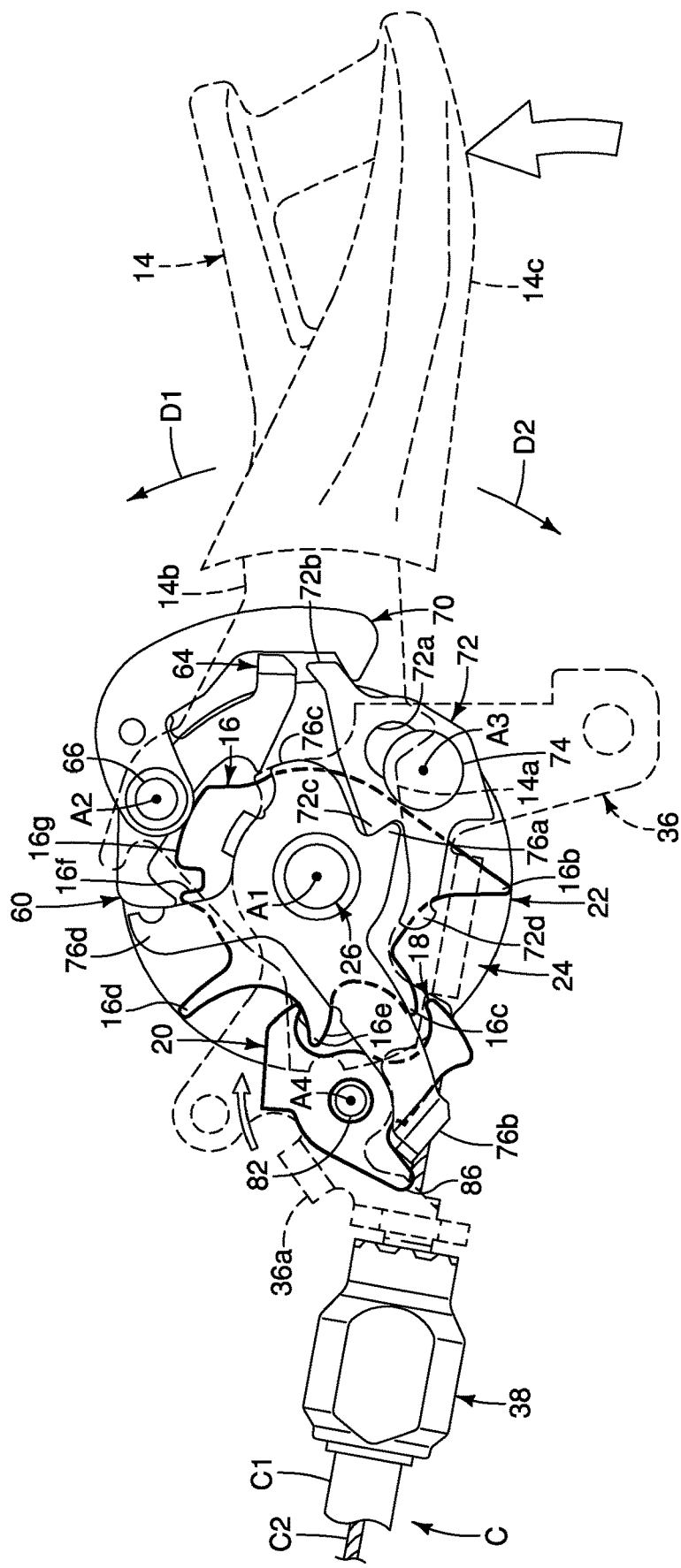
FIG. 15 is a bottom view of the selected parts of the bicycle operating device in FIGS. 1 to 3 in which a positioning pawl is disengaged from the positioning ratchet in response to the user operated member being operated from the second rest position of FIG. 14 in the first direction to perform a cable releasing operation.
Figure 21:
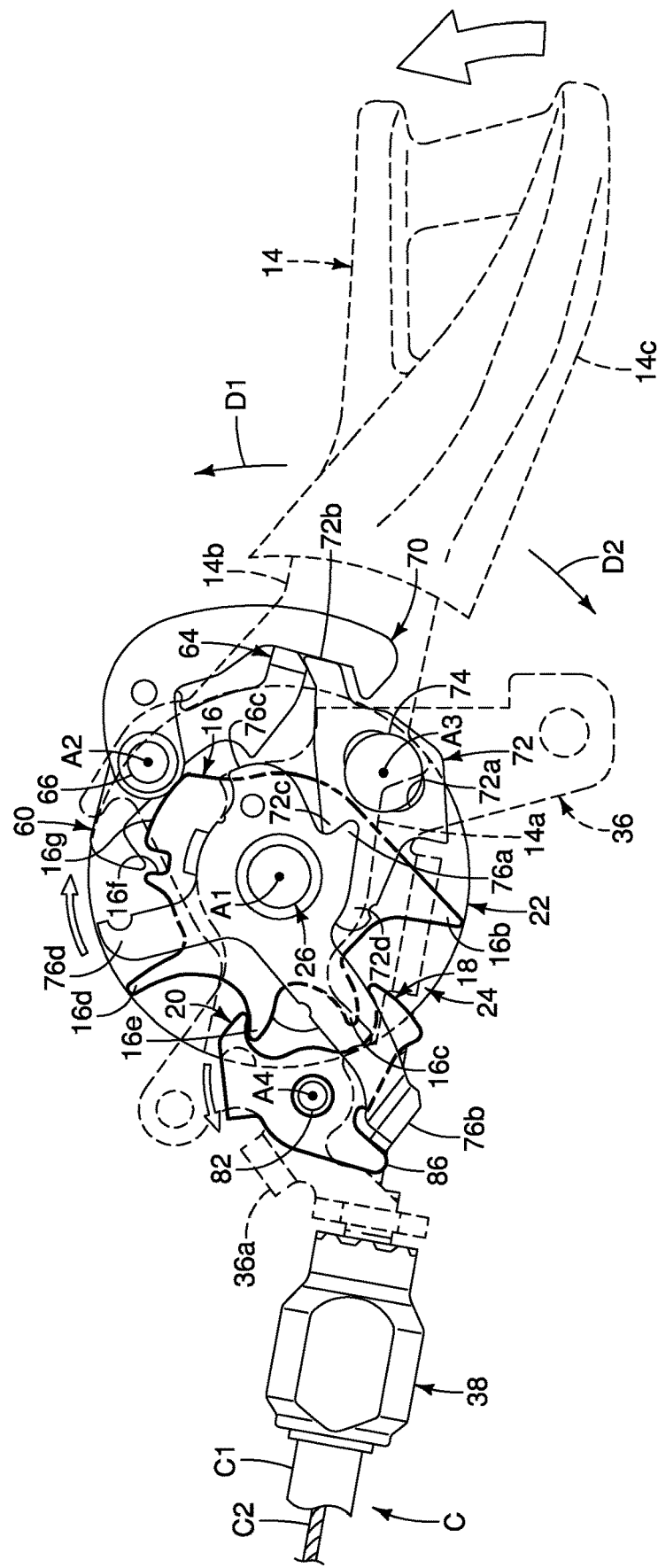
FIG. 21 is a bottom view of the selected parts of the bicycle operating device in FIGS. 1 to 3 in which the user operated member has been moved slightly in the first direction from the operated position of FIG. 20 such that the stopping pawl temporarily limits movement of the positioning ratchet in the cable releasing direction.

The positioning ratchet 16 includes a first stop tooth 16d and a second stop tooth 16e. The first stop tooth 16d and the second stop tooth 16e are configured to contact the stopping pawl 20. More specifically, as seen in FIG. 12, the first stop tooth 16d is configured to contact the stopping pawl 20 during a pulling operation. Namely, the first stop tooth 16d limits the movement of the user operated member 14, the positioning ratchet 16 and the wire takeup 22 in the first direction D1 during a pulling operation. While the first stop tooth 16d is not shown in FIG. 12 as contacting the stopping pawl 20, the user operated member 14 can be pivoted in the first direction D1 during a pulling operation such that the first stop tooth 16d contacts the stopping pawl 20 to prevent further movement of the user operated member 14, the positioning ratchet 16 and the wire takeup 22 in the first direction D1. The second stop tooth 16e is configured to contact the stopping pawl 20 during a releasing operation. Namely, the second stop tooth 16e temporarily limits the movement of the positioning ratchet 16 and the wire takeup 22 in the second direction D2 during a releasing operation as seen in FIGS. 15 and 21.

The positioning ratchet 16 further includes a pulling abutment 16f. The pulling pawl 60 is configured to engage the pulling abutment 16f to pivot the positioning ratchet 16 in the first direction D1 from the first position to the second position during a pulling operation. The positioning ratchet 16 further includes a cam 16g that contacts the pulling pawl 60 when the positioning ratchet 16 is in the second position and the user operated member 14 is in the second rest position. Thus, the cam 16g of the positioning ratchet 16 pivots the pulling pawl 60 against the biasing force of the biasing element so that the first release pawl 64 is pivoted into contact with the pawl abutment 76c and configured to contact the extension part 72b of the first release member 72. In this way, the first release pawl 64 and the pulling pawl 60 are held immobile while the positioning ratchet 16 is in the second position and the user operated member 14 is in the second rest position. Also, this pivotal movement of the pulling pawl 60 and the first release pawl 64 causes the biasing force of the biasing element acting on the second release pawl 70 to increase.

Now, the positioning pawl 18 and the stopping pawl 20 will be discussed in more detail. In the illustrated embodiment, the positioning pawl 18 and the stopping pawl 20 are a single member that is pivotally mounted to the base 12. The positioning pawl 18 is movably arranged with respect to the base 12 between a holding (engaged) position and a non-holding (disengaged) position, while the stopping pawl 20 movably arranged with respect to the base 12 between a non-stopping (disengaged) position and a stopping (engaged) position. Specifically, as seen in FIGS. 4 and 5, the positioning pawl 18 and the stopping pawl 20 are pivotally mounted on a pivot pin 82 that is coupled to the upper support plate 34 and the lower support plate 36. A biasing element 84 is disposed on the pivot pin 82 to bias the positioning pawl 18 towards the positioning ratchet 16 and the stopping pawl 20 away from the positioning ratchet 16. The rest position of the positioning pawl 18 and the stopping pawl 20 is established by the lower support plate 36. In particular, the lower support plate 36 has an abutment 36a and the biasing element 84 biases a projection 86 of the member that forms both the positioning pawl 18 and the stopping pawl 20 against the abutment 36a to establish a rest position of the member that forms both the positioning pawl 18 and the stopping pawl 20. In the illustrated embodiment, the force transmission finger 76b of the second release member 76 contacts the projection 86 in the second direction D2 while the user operated member 14 is in the second rest position. As mentioned above, the first release member 72 and the second release member 76 do not move relative to each other while the user operated member 14 is in either the first rest position or the second rest position so that the first release member 72 is biased by the biasing force of the biasing element 84 in addition to the biasing force of the first biasing element 78. Thus, the operating force of the first release member 72 about the pivot axis A1 in the second direction D2 is larger than the rotating force of the first release pawl 64 about the pivot axis A1 in the second direction D2 such that it is possible to firmly establish the second position of the user operated member. However, a gap between the force transmission finger 76b of the second release member 76 and the projection 86 can be formed while the user operated member 14 is in the second rest position as needed and/or desired.

Figure 11:
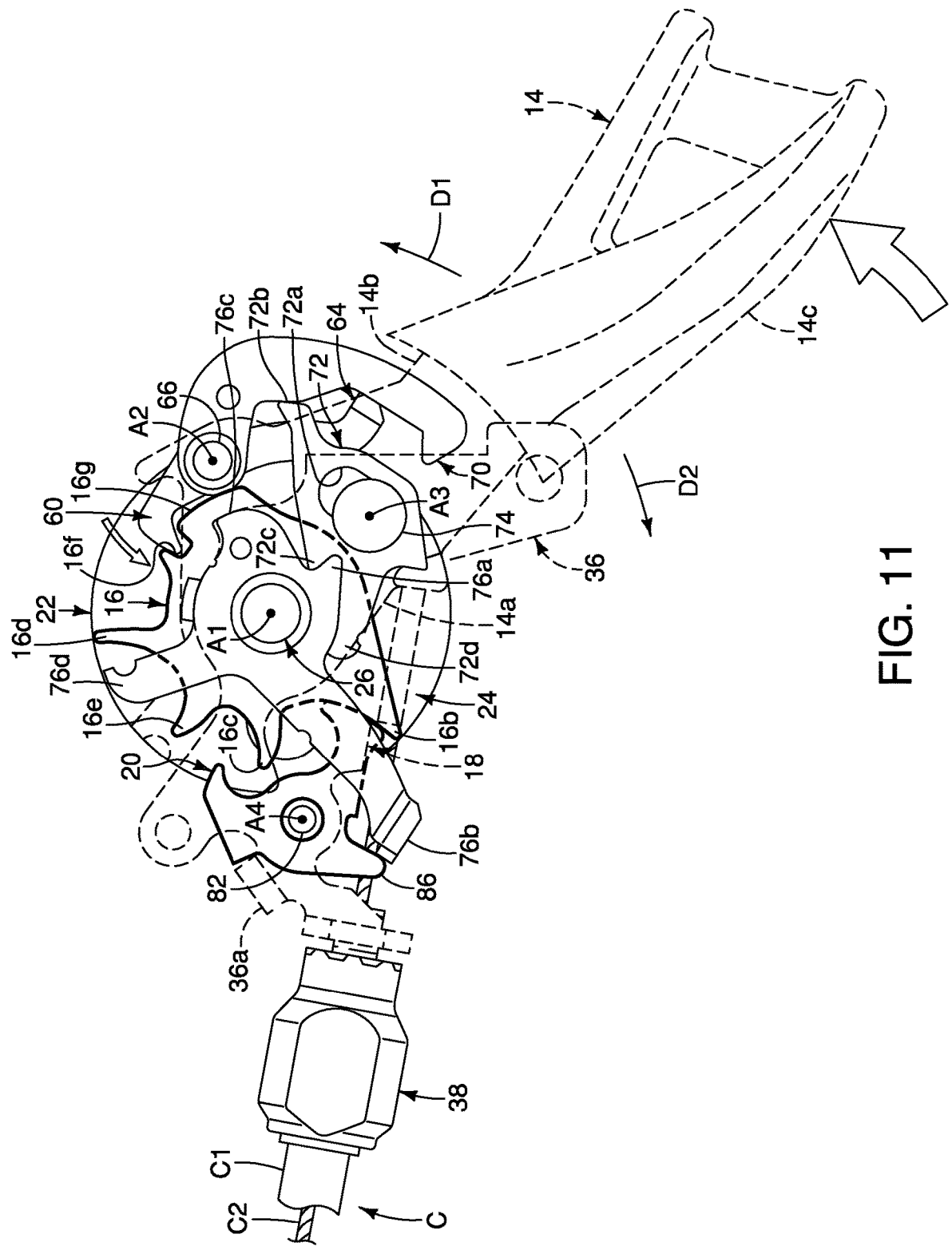
FIG. 11 is a bottom view of the selected parts of the bicycle operating device in FIGS. 1 to 3 in which the user operated member has been moved from the first rest position in a first direction towards an operated position to perform a cable pulling operation.
Figure 14:
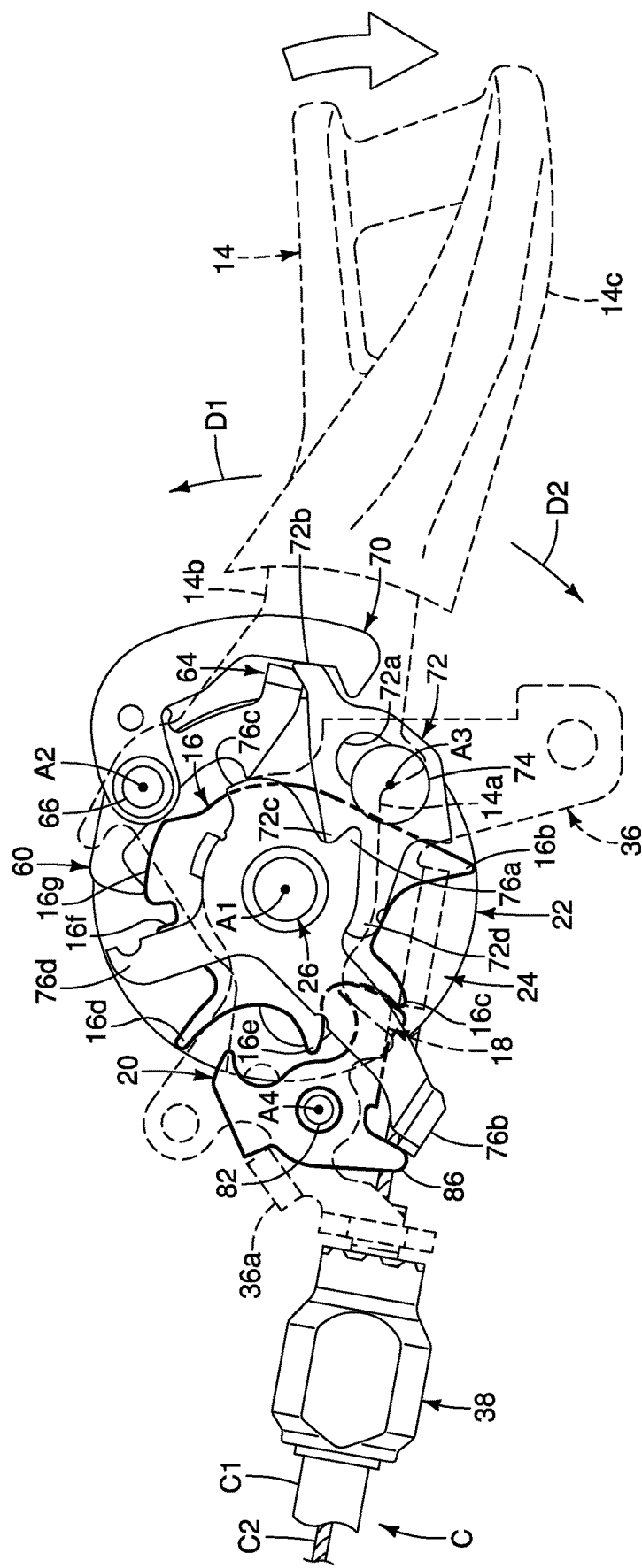
FIG. 14 is a bottom view of the selected parts of the bicycle operating device in FIGS. 1 to 3 in which the user operated member has moved farther from an intermediate position of FIG. 13 in the second direction such that the positioning ratchet is maintained in a second position and the user operated member is maintained in a second rest position.

Basically, when the positioning pawl 18 is engaged with the positioning ratchet 16, one of the first and second positions of the positioning ratchet 16 is established and the stopping pawl 20 is disengaged from the positioning ratchet 16 as seen in FIGS. 11 and 14. In this way, the user operated member 14 can be operated to either perform a releasing operation or a pulling operation depending on the position of the positioning ratchet 16. In either a releasing operation or a pulling operation, the positioning pawl 18 is disengaged from the positioning ratchet 16 to allow the positioning ratchet 16 and the wire takeup 22 to pivot in the releasing direction (the second direction D2) about the pivot axis A1. As previously mentioned, the positioning ratchet 16 is preferably biased by the second biasing element 80 in the releasing direction (the second direction D2) about the pivot axis A1.

For a pulling operation, the positioning pawl 18 is disengaged from the positioning ratchet 16 by the second positioning tooth 16c contacting and moving the positioning pawl 18 against the force of the biasing element 84 towards a disengaged position in response to the user operated member 14 being operated from the first rest position in the first direction D1. For a releasing operation, the positioning pawl 18 is disengaged from the positioning ratchet 16 by the first release member 72 in response to the user operated member 14 being operated from the second rest position in one of the first direction D1 and the second direction D2.

Figure 10:
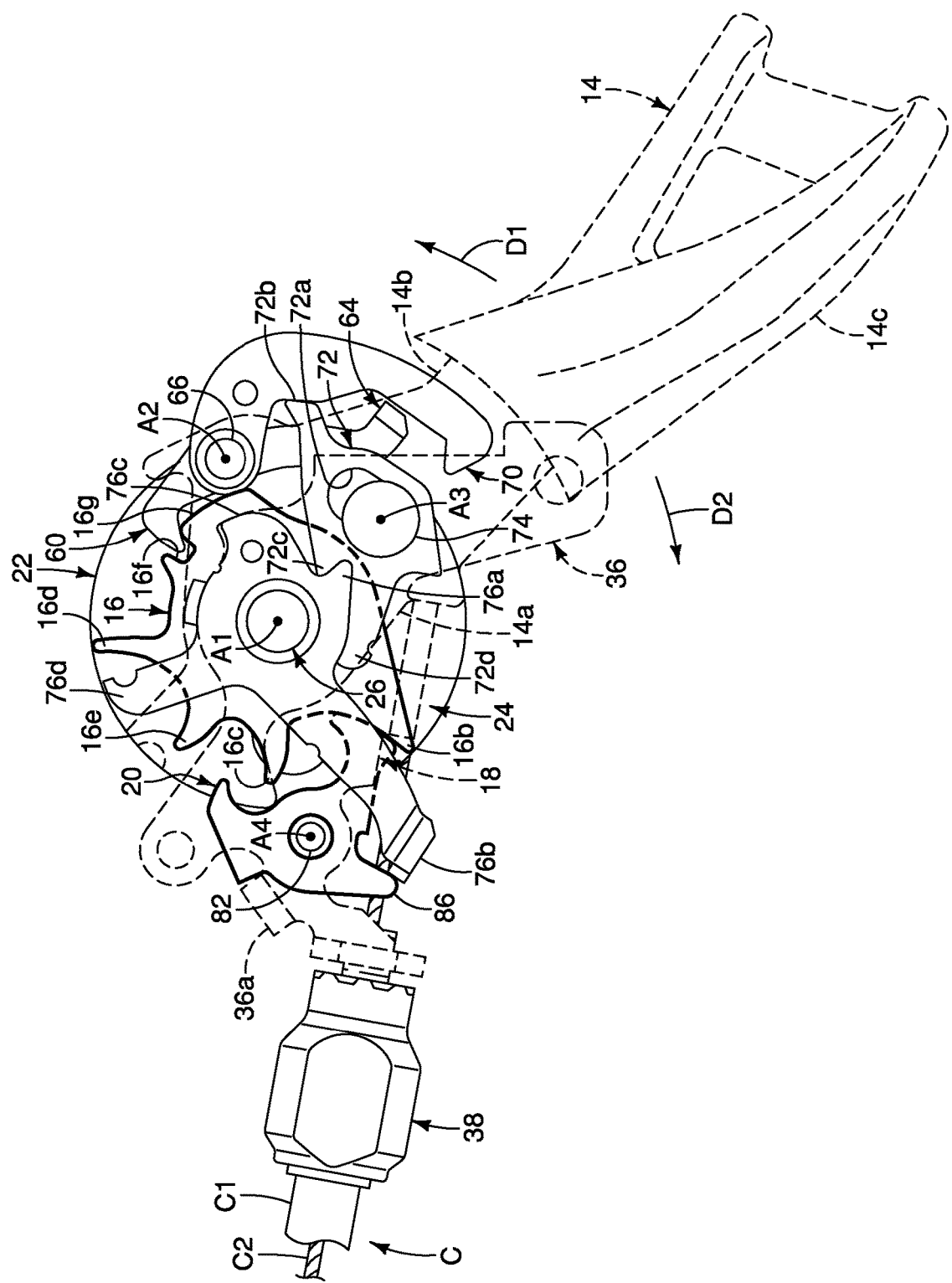
FIG. 10 is a bottom view of the selected parts of the bicycle operating device in FIGS. 1 to 3 in which a positioning ratchet of the bicycle operating device is maintained in a first position and a user operated member of the bicycle operating device is maintained in a first rest position.

As seen in FIGS. 10 to 14, a pulling operation is illustrated in which the wire takeup 22 is pivoted in the first direction D1 in response to the user operated member 14 being moved in the first direction D1. As seen in FIG. 10, the positioning pawl 18 is engaged with the first positioning tooth 16b of the positioning ratchet 16 to establish the first position of the positioning ratchet 16. Here, the user operated member 14 is in the first rest position by the attachment portion 14a abutting against an abutment of the lower support plate 36, and the stopping pawl 20 is in the non-holding (disengaged) position. Also as seen in FIG. 10, the first and second release members 74 and 76 are in the non-releasing position.

As seen in FIG. 11, as the user operated member 14 being moved in the first direction D1, the pulling pawl 60 contacts the pulling abutment 16f of the positioning ratchet 16. Now, as seen in FIG. 12, further movement of the user operated member 14 in the first direction D1 causes the positioning ratchet 16 and the wire takeup 22 to move in the first direction D1. The second release pawl 70 rides over the extension part 72b of the first release member 72 as the user operated member 14 moves in the first direction D1. The first release pawl 64 contacts the second release pawl 70 to prevent the second release pawl 70 from moving in a direction towards the positioning ratchet 16 during movement of the user operated member 14 in the first direction D1.

As seen in FIG. 12, as the positioning ratchet 16 pivots in the first direction D1, the second positioning tooth 16c also contacts the positioning pawl 18 to pivot the positioning pawl 18 towards the non-holding position and pivot the stopping pawl 20 into the path of the positioning ratchet 16. The first stop tooth 16d limits movement of the positioning ratchet 16 and the wire takeup 22 in the first direction D1.

Figure 13:
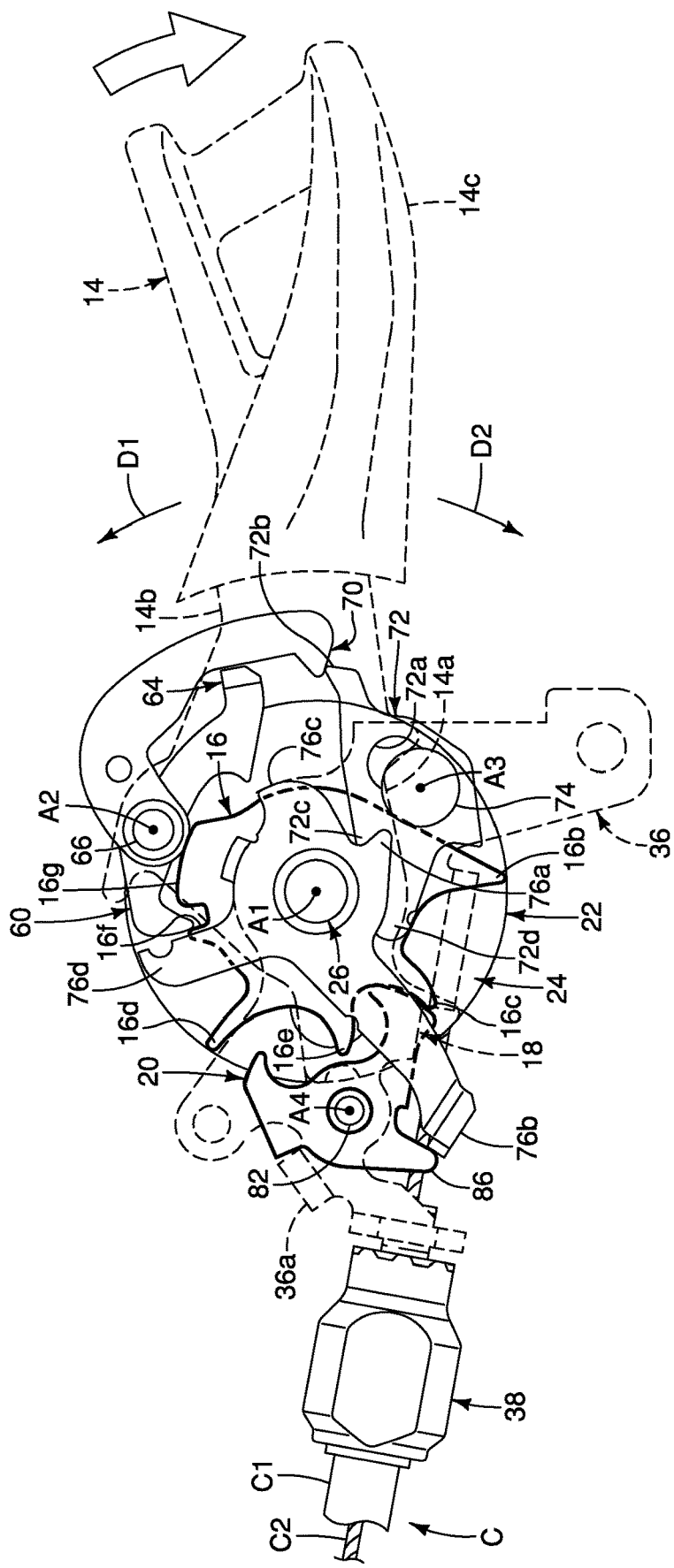
FIG. 13 is a bottom view of the selected parts of the bicycle operating device in FIGS. 1 to 3 in which the user operated member has been released from the operated position of FIG. 12 to move in a second direction.

Then, as seen in FIG. 13, the positioning pawl 18 pivots to the holding position where the positioning pawl 18 now engages the second positioning tooth 16c of the positioning ratchet 16 to establish the second position of the positioning ratchet 16. Also, as seen in FIG. 13, the user releases the user operated member 14 so that the user operated member 14 starts to move towards the second rest position under the biasing force of the biasing element 76.

As seen in FIG. 14, the extension part 72b is sandwiched between the first release pawl 64 and the second release pawl 70. As seen in FIG. 14, the first release pawl 64 contacts the extension part 72b of the first release member 72 and is stopped pivoting around the axis A1 by the first release member 72. The operating force of the first release member 72 about the pivot axis A1 in the second direction D2 is larger than the rotating force of the first release pawl 64 about the pivot axis A1 in the second direction D2 such that the user operated member 14 stops at the second rest position.

Referring now to FIGS. 14 to 19, a releasing operation will now be discussed in which the user operated member 14 is operated in the first direction D1. With the user operated member 14 in the second rest position as shown in FIG. 14, the positioning pawl 18 is engaged with the second positioning tooth 16c of the positioning ratchet 16 to establish the second position of the positioning ratchet 16. Also, as seen in FIG. 14, the pulling pawl 60 contacts the cam 16g of the positioning ratchet 16 to hold the pulling pawl 60 in a non-engagement position, and the first release pawl 64 also contacts the pawl abutment 76c. In this way, the first release pawl 64 is prevented from rotating about the pivot axis A2 so that the first release pawl 64 is configured to firmly contact the extension part 72b of the first release member 72.

When the user operated member 14 is operated in the first direction D1 as shown in FIG. 15, the second release pawl 70 engages the extension part 72b of the first release member 72. This engagement of the extension part 72b of the first release member 72 by the second release pawl 70 causes the first release member 72 to pivot about the pivot axis A3. As the first release member 72 pivot about the pivot axis A3, the first projection 72c of the first release member 72 contacts and moves the force reception finger 76a of the second release member 76 such that the second release member 76 pivots about the pivot axis A1 in the second direction D2. As the second release member 76 pivots about the pivot axis A1, the force transmission finger 76b contacts and moves the projection 86 of the member that forms both the positioning pawl 18 and the stopping pawl 20. In this way, the positioning pawl 18 is pivoted to the non-holding position and the stopping pawl 20 is pivoted towards the stopping position. Thus, the positioning ratchet 16 can move in the releasing or second direction D2 until the second stop tooth 16e contacts the stopping pawl 20. The second stop tooth 16e momentarily stops the positioning ratchet 16. Basically, the positioning pawl 18 is disengaged from the positioning ratchet 16 which permits movement of the positioning ratchet 16 in a releasing direction while the stopping pawl 20 is engaged with the positioning ratchet 16 which limits movement of the positioning ratchet 16 to move in the releasing direction in response to the user operated member 14 being moved in one of the first direction D1 and the second direction D2.

Figure 16:
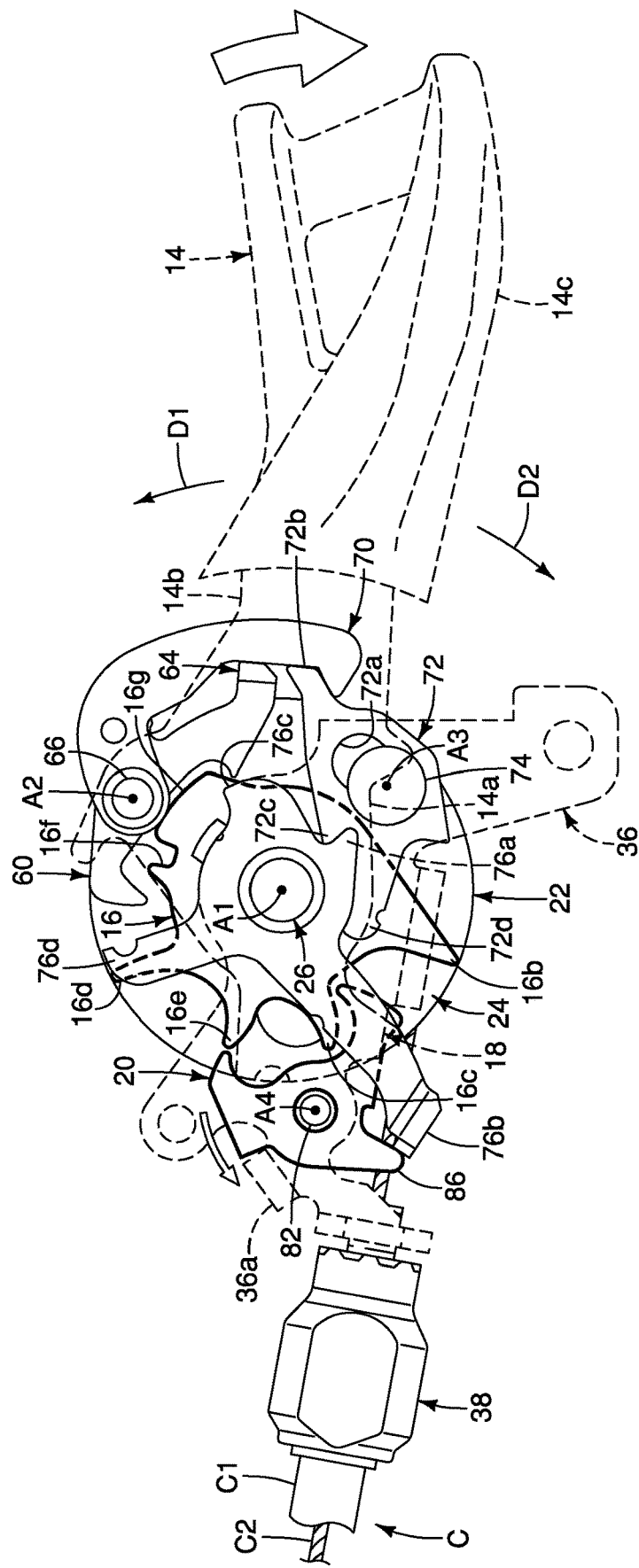
FIG. 16 is a bottom view of the selected parts of the bicycle operating device in FIGS. 1 to 3 in which the user operated member has been released from the operated position of FIG. 15 to move in the second direction and a stopping pawl is moved into the path of the positioning ratchet to temporarily limit movement of the positioning ratchet in a cable releasing direction.
Figure 17:
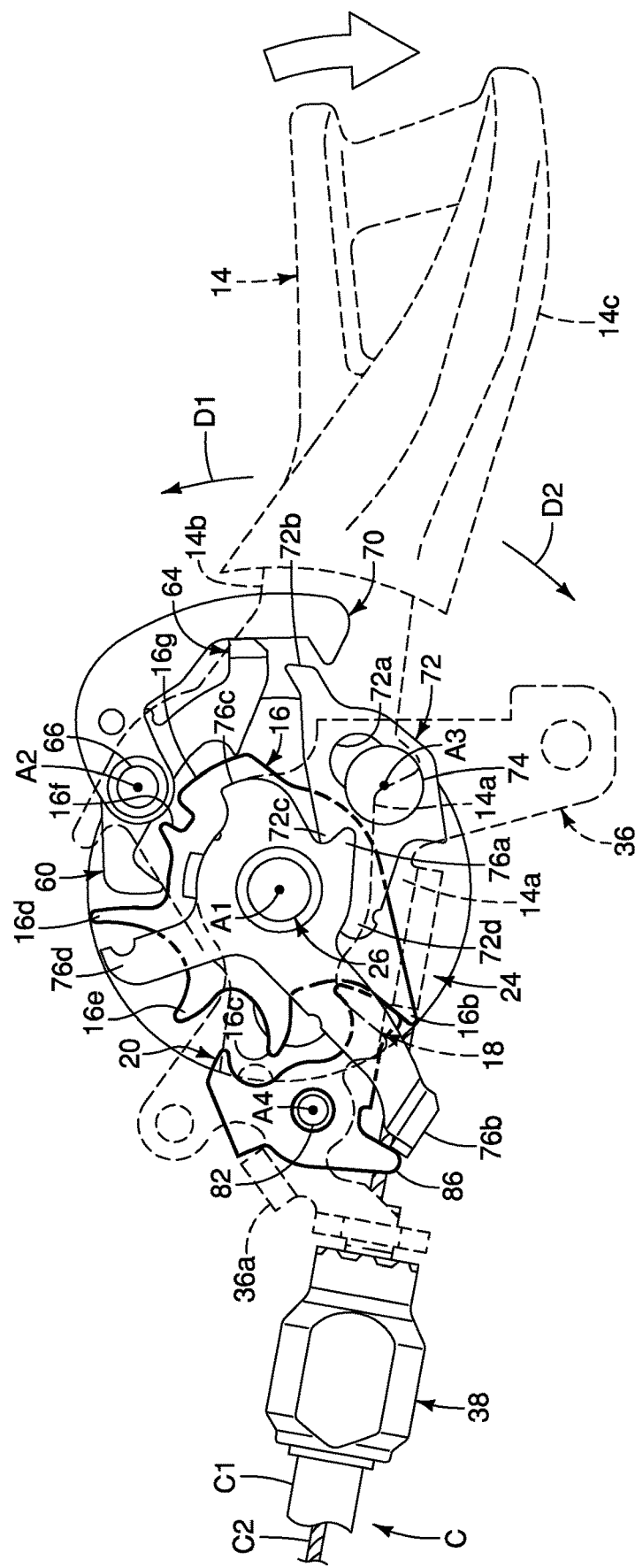
FIG. 17 is a bottom view of the selected parts of the bicycle operating device in FIGS. 1 to 3 in which the user operated member has moved farther from an intermediate position of FIG. 16 in the second direction such that the positioning ratchet is maintained in the first position while the user operated member continues to move in the second direction towards the first rest position.
Figure 18:
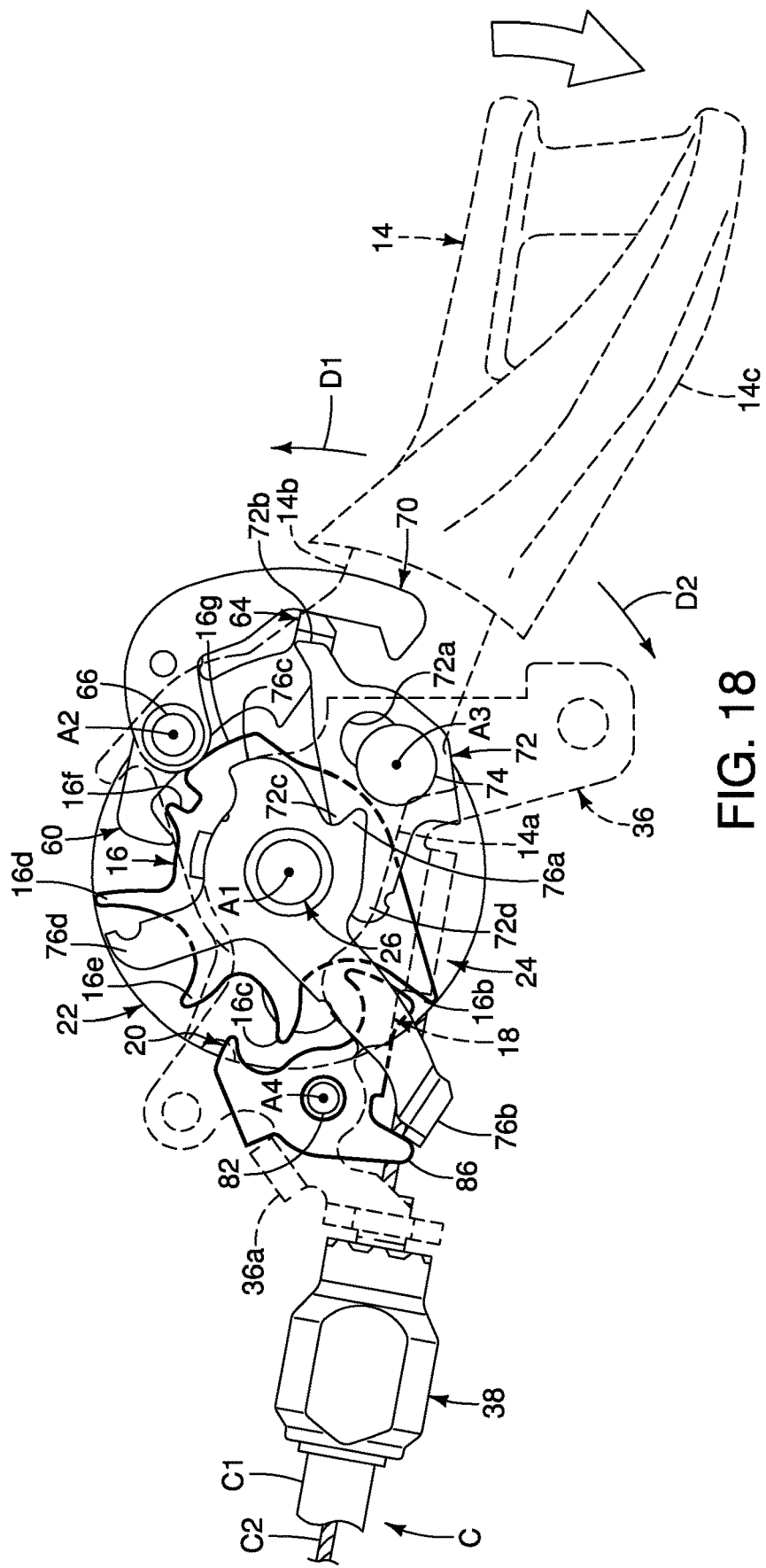
FIG. 18 is a bottom view of the selected parts of the bicycle operating device in FIGS. 1 to 3 in which the user operated member has moved farther from an intermediate position of FIG. 17 in the second direction towards the first rest position.
Figure 19:
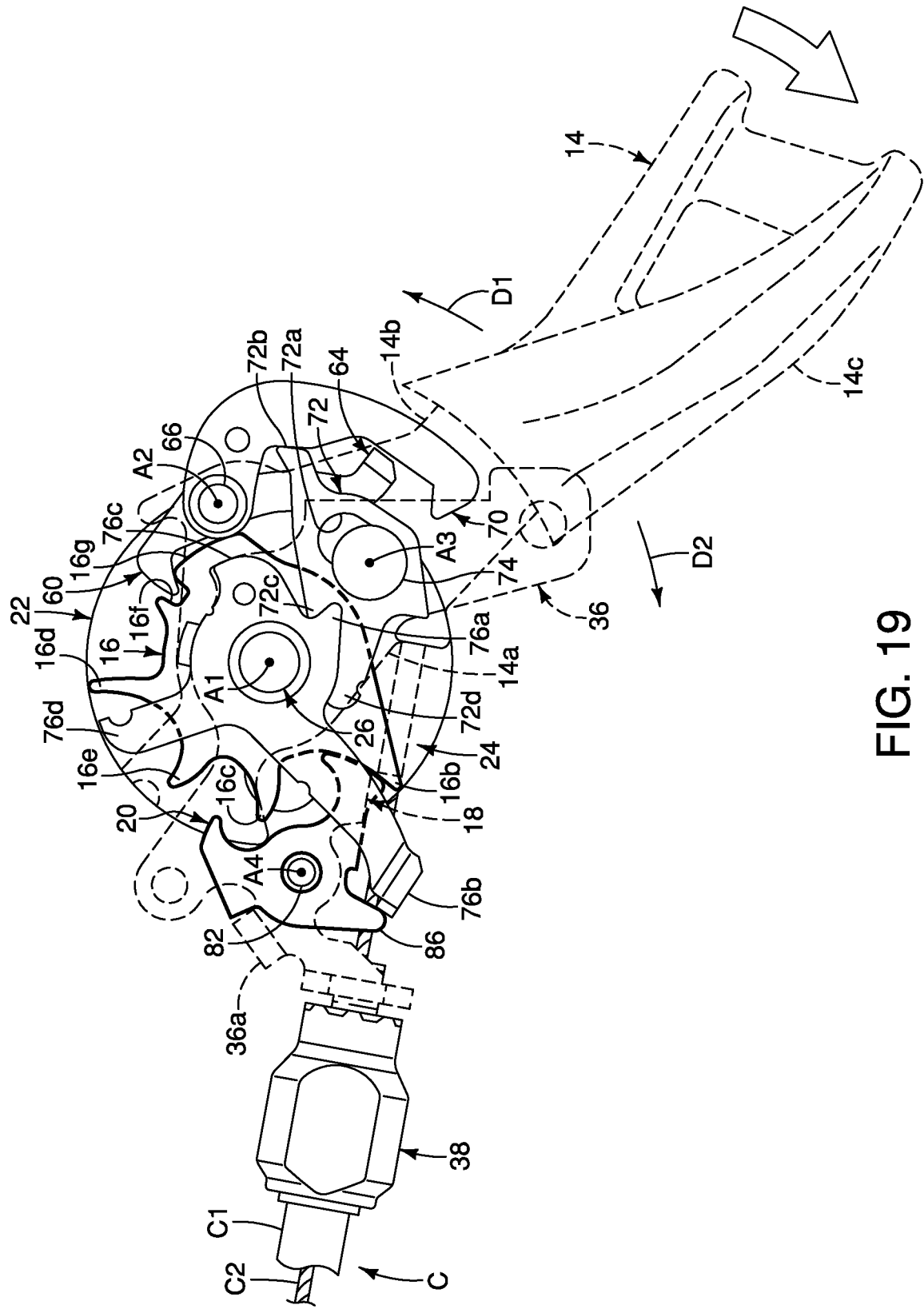
FIG. 19 is a bottom view of the selected parts of the bicycle operating device in FIGS. 1 to 3 in which the user operated member has moved farther from an intermediate position of FIG. 18 in the second direction such that user operated member reaches the first rest position.

Then, as seen in FIGS. 16 to 18, the user releases the user operated member 14 so that the user operated member 14 starts to move towards the first rest position under the biasing force of the biasing element 78. Thus, the user operated member 14 starts to move in the second direction D2. As a result, the first and second release members 72 and 76 move back to the non-releasing positions in the first direction D1 such that as the stopping pawl 20 pivots back towards the non-stopping position, the positioning pawl 18 pivots towards the holding position. As seen in FIGS. 17 and 18, once the positioning ratchet 16 is back to the first position, the first release pawl 64 contacts the cam 16g of the positioning ratchet 16 such that the first release pawl 64 is prevented from engaging with the extension part 72b of the first release member 72. Thus, the first release pawl 64 rides over the extension part 72b of the first release member 72 as the user operated member 14 moves in the second direction D2. Then, as seen in FIG. 19, the user operated member 14 returns to the first rest position where the positioning pawl 18 is engaged with the first positioning tooth 16b of the positioning ratchet 16. As seen in FIGS. 16 to 18, the stopping pawl 20 is disengaged from the positioning ratchet 16 which permits movement of the positioning ratchet 16 in the releasing direction while the positioning pawl 18 is engaged with the positioning ratchet 16 which limits movement of the positioning ratchet 16 to move in the releasing direction in response to the user operated member 14 being moved in the second direction D2 in a state where the positioning ratchet 16 is between the second position and the first position.

Referring now to FIGS. 14 and 20 to 25, a releasing operation will now be discussed in which the user operated member 14 is operated in the second direction D2. With the user operated member 14 in the second rest position as shown in FIG. 14, the positioning pawl 18 is engaged with the second positioning tooth 16c of the positioning ratchet 16 to establish the second position of the positioning ratchet 16. Also, as seen in FIG. 14, the pulling pawl 60 contacts the cam 16g of the positioning ratchet 16 to hold the pulling pawl 60 in a non-engagement position, and the first release pawl 64 also contacts the pawl abutment 76c. In this way, the first release pawl 64 is prevented from rotating about the pivot axis A2 so that the first release pawl 64 is configured to firmly contact the extension part 72b of the first release member 72.

Figure 20:
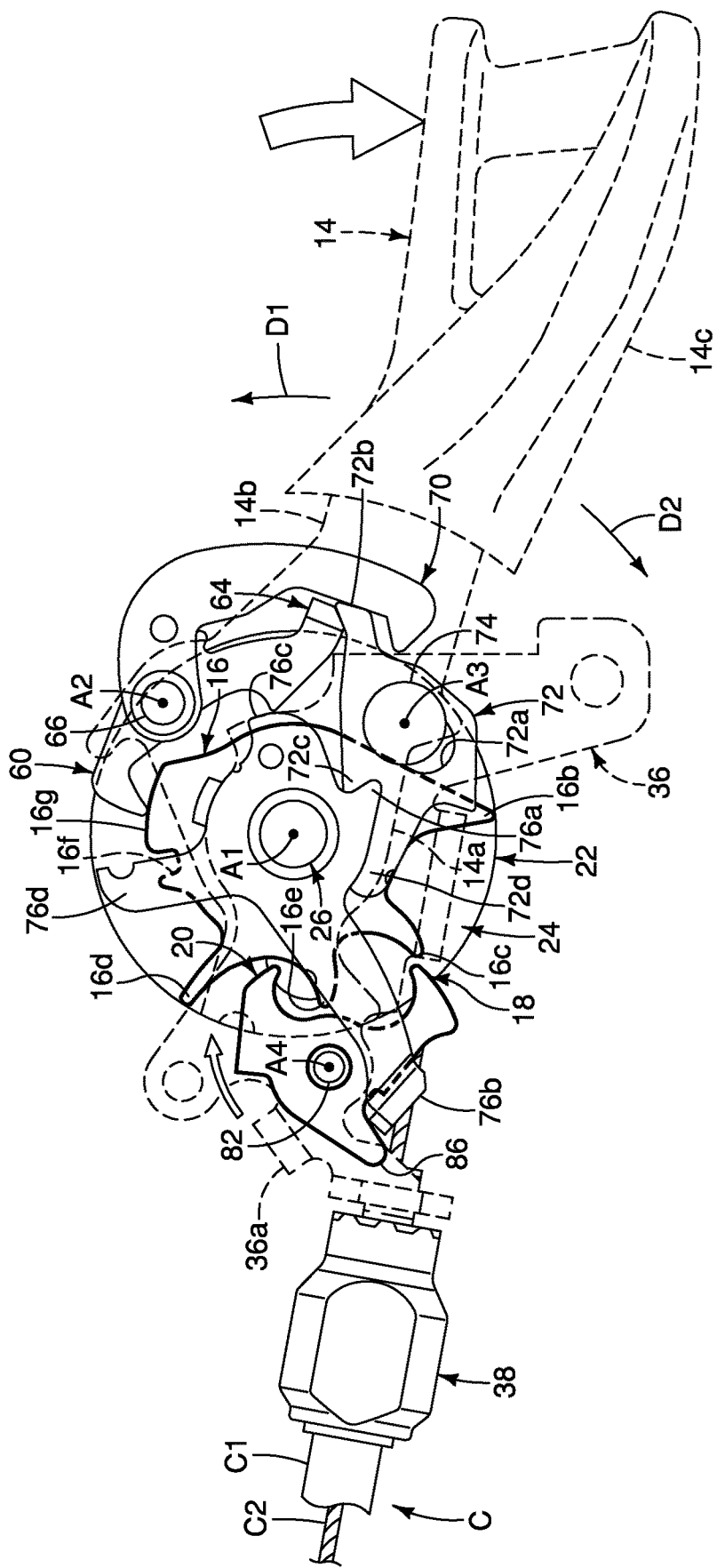
FIG. 20 is a bottom view of the selected parts of the bicycle operating device in FIGS. 1 to 3 in which the positioning pawl is disengaged from the positioning ratchet in response to the user operated member being operated from the second rest position of FIG. 14 in the second direction to perform a cable releasing operation.

When the user operated member 14 is operated in the second direction D2 as shown in FIG. 20, here, the first and second release members 72 and 76 move together as a unit about the pivot axis A1. Thus, the first release member 72 moves on the support pin 74. As the first and second release members 72 and 76 pivots about the pivot axis A1 in the second direction D2, the force transmission finger 76b contacts and moves the projection 86 of the member that forms both the positioning pawl 18 and the stopping pawl 20. In this way, the positioning pawl 18 is pivoted to the non-holding position and the stopping pawl 20 is pivoted towards the stopping position. Thus, the positioning ratchet 16 can move in the releasing or second direction D2 until the second stop tooth 16e contacts the stopping pawl 20. The second stop tooth 16e momentarily stops the positioning ratchet 16. While the user operated member 14 continues being applied force in the second direction D2, the stopping pawl 20 continues contacting the second stop tooth 16e such that the extension part 72b of the first release member 72 continues contacting the first release pawl 64. Thus, while the user operated member 14 continues being applied force in the second direction D2, the extension part 72b of the first release member 72 limits movement of the user operated member 14 in the second direction D2.

Figure 22:
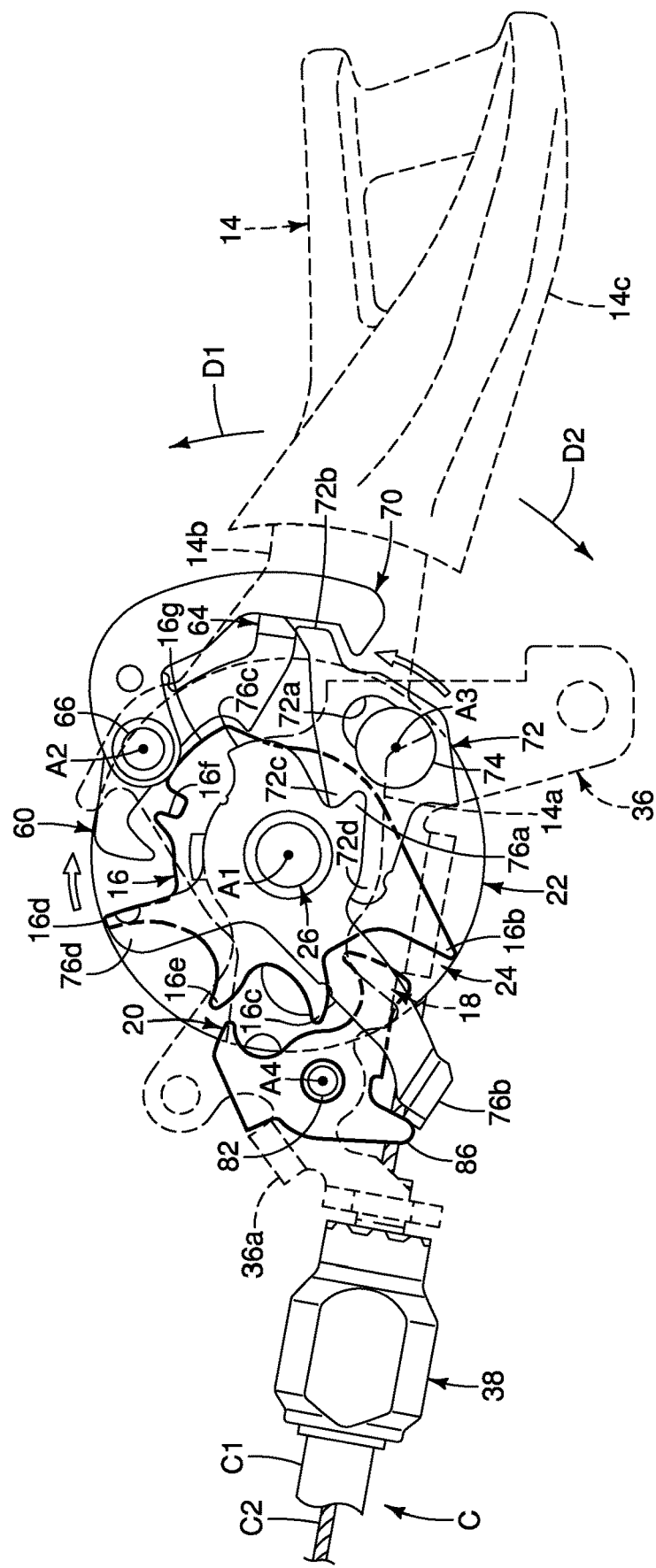
FIG. 22 is a bottom view of the selected parts of the bicycle operating device in FIGS. 1 to 3 in which the user operated member has been slightly moved in the first direction from an intermediate position of FIG. 21 such that the stopping pawl has moved out of the path of the positioning ratchet to allow the positioning ratchet to move farther in the cable releasing direction and the positioning pawl has moved into the path of the positioning ratchet.
Figure 23:
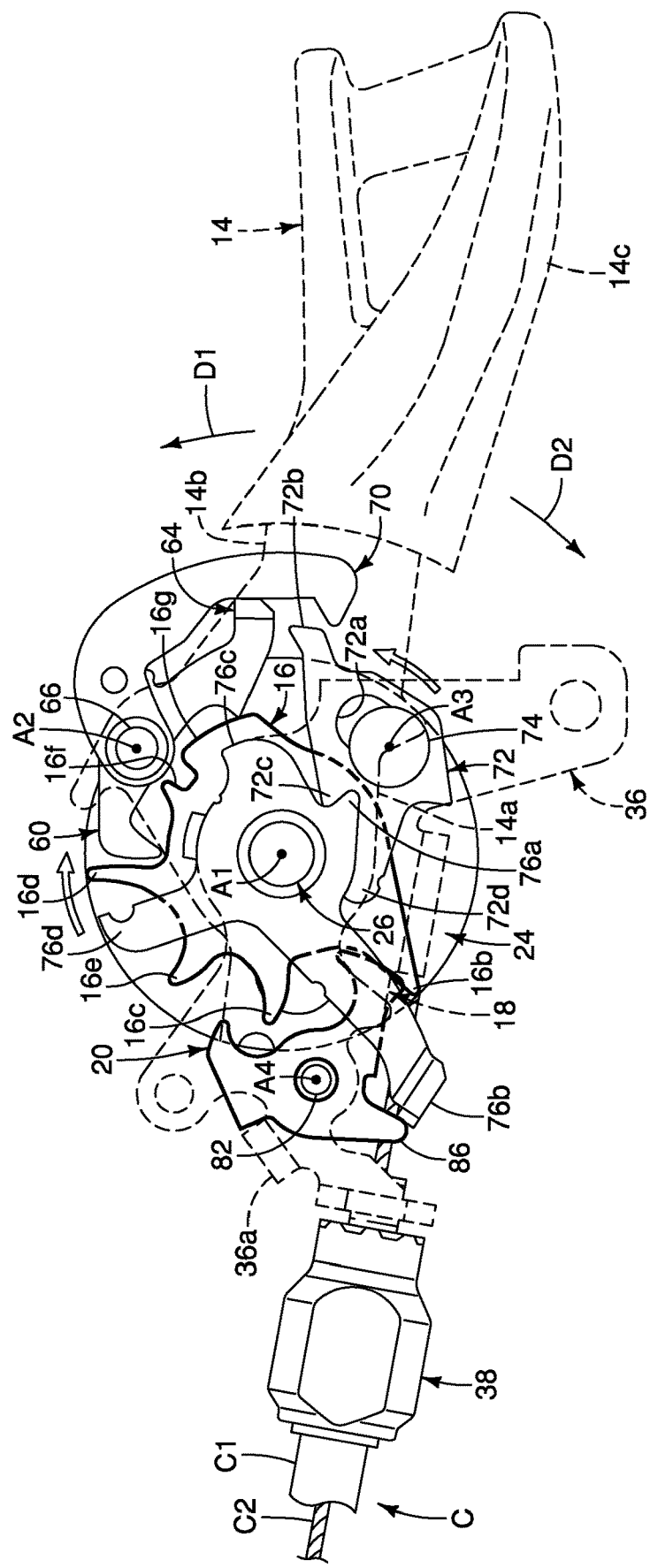
FIG. 23 is a bottom view of the selected parts of the bicycle operating device in FIGS. 1 to 3 in which the positioning ratchet has moved to abut the positioning ratchet while the user operated member is in the intermediate position of FIG. 22.
Figure 24:
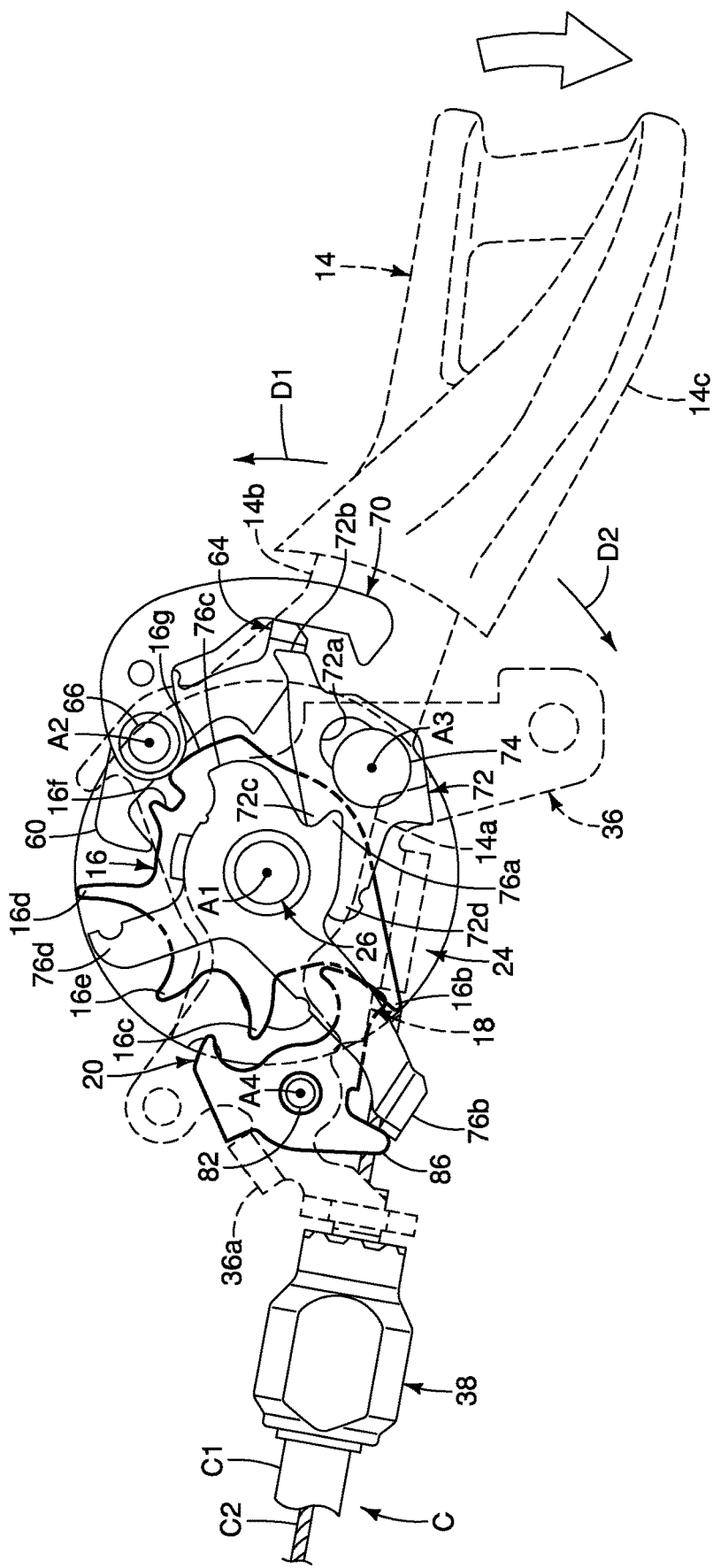
FIG. 24 is a bottom view of the selected parts of the bicycle operating device in FIGS. 1 to 3 in which the user operated member starts to move in the second direction from the intermediate position of FIG. 23.
Figure 25:
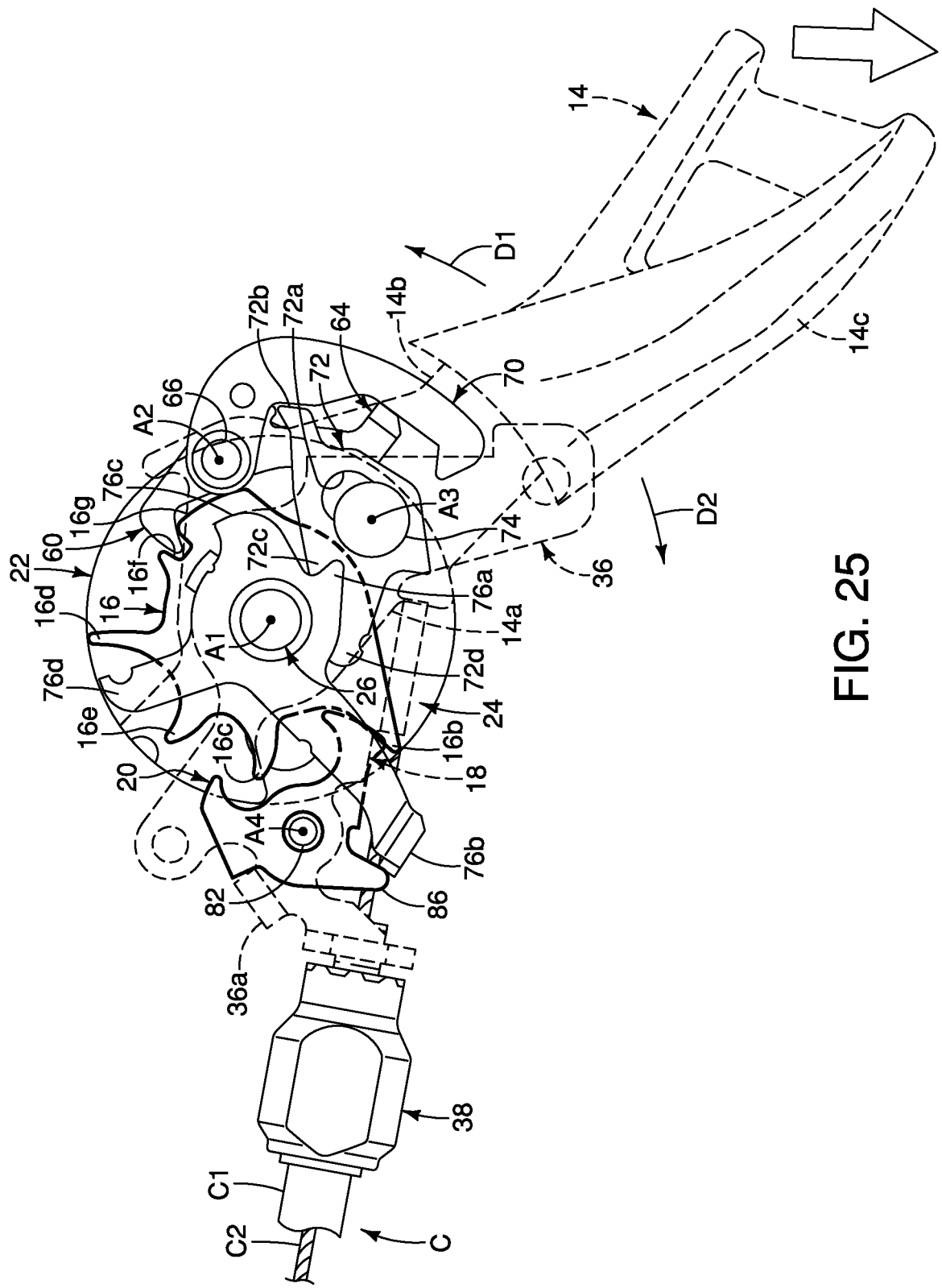
FIG. 25 is a bottom view of the selected parts of the bicycle operating device in FIGS. 1 to 3 in which the user operated member has moved farther from the intermediate position of FIG. 24 in the second direction such that user operated member reaches the first rest position.

Then, as seen in FIG. 21, once the user operated member 14 is released force in the second direction D2 and moves in the first direction D1, the first and second release members 72 and 76 move back to their non-releasing positions. Once the first and second release members 72 and 76 moves back to their non-releasing positions as shown in FIG. 22, the stopping pawl 20 pivots back towards the non-stopping position, the positioning pawl 18 pivots towards the holding position. As a result, as seen in FIG. 23, the positioning pawl 18 moves into engagement with the first positioning tooth 16b of the positioning ratchet 16. As seen in FIGS. 23 and 24, once the positioning ratchet 16 is back to the first position, the first release pawl 64 contacts the cam 16g of the positioning ratchet 16 such that the first release pawl 64 is prevented from engaging with the extension part 72b of the first release member 72. As a result, the movement of the user operated member 14 in the second direction D2 becomes permitted. Thus, the first release pawl 64 rides over the extension part 72b of the first release member 72 as the user operated member 14 moves in the second direction D2. Then, as seen in FIGS. 24 and 25, the user operated member 14 returns to the first rest position under the biasing force of the biasing element 78.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle operating device. Accordingly, these directional terms, as utilized to describe the bicycle operating device should be interpreted relative to a bicycle in an upright riding position on a horizontal surface and that is equipped with the bicycle operating device. The terms "left" and "right" are used to indicate the "right" when referencing from the right side as viewed from the rear of the bicycle, and the "left" when referencing from the left side as viewed from the rear of the bicycle.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:
   a base;
   a positioning ratchet movably arranged with respect to the base between a first position and a second position;
   a positioning pawl movably arranged with respect to the base, the positioning pawl being engaged with the positioning ratchet to selectively maintain the positioning ratchet in each of the first position and the second position;
   a user operated member movably arranged with respect to the base, the user operated member being disposed in a first rest position while the positioning ratchet is in the first position and being disposed in a second rest position while the positioning ratchet is in the second position;
   a first release member movably arranged with respect to the base, the positioning pawl being disengaged from the positioning ratchet in response to the user operated member being operated from the second rest position in one of a first direction and a second direction, the second direction being different from the first direction; and
   a first release pawl provided on the user operated member, the first release pawl contacting the first release member at the second position to maintain the user operated member at the second rest position; and
   the user operated member includes a pulling pawl, the pulling pawl moving the positioning ratchet from the first position to the second position in response to the user operated member being moved in the first direction.

2. The bicycle operating device according to claim 1, wherein
   the first release pawl moves the first release member which moves the positioning pawl such that the positioning pawl permits movement of the positioning ratchet from the second position to the first position in response to the user operated member being moved in the second direction.

3. The bicycle operating device according to claim 1, further comprising
   a second release pawl provided on the user operated member, the second release pawl moves the first release member which moves the positioning pawl such that the positioning pawl permits movement of the positioning ratchet from the second position to the first position in response to the user operated member being moved in the first direction.

4. The bicycle operating device according to claim 3, wherein
   the first release member includes an extension part, the extension part is sandwiched between the first release pawl and the second release pawl while the user operated member remains at the second rest position.

5. The bicycle operating device according to claim 3, wherein
   the first release pawl and the second release pawl are pivotally mounted to the user operated member.

6. The bicycle operating device according to claim 5, wherein
   the first release pawl and the second release pawl pivot about a single pivot axis.

7. The bicycle operating device according to claim 1, wherein
   the user operated member and the positioning ratchet are pivotally mounted with respect to the base about a pivot axis.

8. The bicycle operating device according to claim 7, wherein
   the user operated member and the positioning ratchet are biased about the pivot axis in the second direction.

9. The bicycle operating device according to claim 7, further comprising
   a first biasing element that biases the user operated member with respect to the base in the second direction, and
   a second biasing element that biases the positioning ratchet with respect to the base in the second direction.

10. The bicycle operating device according to claim 1, wherein
    the first release pawl and the pulling pawl are pivotally mounted to the user operated member.

11. The bicycle operating device according to claim 10, wherein
    the first release pawl and the pulling pawl pivot about a single pivot axis.

12. The bicycle operating device according to claim 11, wherein
the first release pawl and the pulling pawl are a single member.

13. The bicycle operating device according to claim 1, further comprising
a wire takeup provided to the positioning ratchet.

14. The bicycle operating device according to claim 1, further comprising
a second release member movably arranged with respect to the base, the second release member being different from the first release member, the second release member moving the positioning pawl so that the positioning pawl is disengaged from the positioning ratchet in response to the first release member moving the second release member.

15. The bicycle operating device according to claim 1, further comprising
a handlebar attachment coupled to the base.

16. A bicycle operating device comprising:
a base;
a positioning ratchet movably arranged with respect to the base between a first position and a second position;
a positioning pawl movably arranged with respect to the base, the positioning pawl being engaged with the positioning ratchet to selectively maintain the positioning ratchet in each of the first position and the second position;
a user operated member movably arranged with respect to the base, the user operated member being disposed in a first rest position while the positioning ratchet is in the first position and being disposed in a second rest position while the positioning ratchet is in the second position;
a release member movably arranged with respect to the base, the positioning pawl being disengaged from the positioning ratchet in response to the user operated member being operated from the second rest position in one of a first direction and a second direction, the second direction being different from the first direction; and
a stopping pawl movably arranged with respect to the base between a stopping position and a non-stopping position, in a state where the positioning ratchet is in the first position, the positioning ratchet being moved from the first position to the second position in response to the user operated member being moved in the first direction, in a state where the positioning ratchet is in the second position, the positioning ratchet being moved from the second position to the first position in response to the user operated member being moved in the first direction, in a state where the positioning ratchet is in the second position, the positioning ratchet being moved from the second position to the first position in response to the user operated member being moved in the second direction.

17. The bicycle operating device according to claim 16, wherein
the positioning pawl is disengaged from the positioning ratchet which permits movement of the positioning ratchet in a releasing direction while the stopping pawl is engaged with the positioning ratchet which limits movement of the positioning ratchet to move in the releasing direction in response to the user operated member being moved in one of the first direction and the second direction.

18. The bicycle operating device according to claim 17, wherein
the stopping pawl is disengaged from the positioning ratchet which permits movement of the positioning ratchet in the releasing direction while the positioning pawl is engaged with the positioning ratchet which limits movement of the positioning ratchet to move in the releasing direction in response to the user operated member being moved in the second direction in a state where the positioning ratchet is between the second position and the first position.

19. The bicycle operating device according to claim 16, wherein
the positioning pawl and the stopping pawl are a single member that is pivotally mounted to the base.

* * * * *